United States Patent [19]

Yanagi

[11] Patent Number: 5,258,966
[45] Date of Patent: Nov. 2, 1993

[54] POSITIONER SEEK CONTROL SYSTEM OF A DISK APPARATUS AND METHOD FOR SCANNING A BEAM ACROSS A MEDIUM

[75] Inventor: Shigenori Yanagi, Kawasaki, Japan
[73] Assignee: Fujitsu Limited, Kawasaki, Japan
[21] Appl. No.: 702,021
[22] Filed: May 17, 1991

[30] Foreign Application Priority Data

May 17, 1990 [JP] Japan ............................... 2-127607
May 17, 1990 [JP] Japan ............................... 2-127608

[51] Int. Cl.$^5$ .............................................. G11B 7/00
[52] U.S. Cl. ................................. 369/32; 369/44.28
[58] Field of Search ............... 369/32, 44.28, 44.29, 369/54, 44.35, 44.36, 43; 360/77.08, 78.04

[56] References Cited

U.S. PATENT DOCUMENTS

| | | | |
|---|---|---|---|
| 4,866,687 | 9/1989 | Kasai et al. | 369/32 |
| 4,914,725 | 4/1990 | Belser et al. | 360/77.08 |
| 5,003,524 | 3/1991 | Ikeda | 369/44.28 |
| 5,033,037 | 7/1991 | Yanagi | 369/32 |
| 5,038,333 | 8/1991 | Chow et al. | 369/44.28 |
| 5,121,370 | 6/1992 | Yanagi | 369/32 |

FOREIGN PATENT DOCUMENTS 0289143 11/1988 European Pat. Off.
WO89/02150 3/1989 Japan.

OTHER PUBLICATIONS

Copending U.S. patent application Ser. No. 265,460 (Filing date: Oct. 11, 1989).
H. Inada et al., C&C Systems Research Laboratories, NEC Corp., Tracking Servo for Small Size Optical Disk System, Aug. 18, 1986 SPIE, vol. 695, pp. 130–131, Optical Mass Data Storage II, Bellingham, Wash., USA.
Robert P. Freese et al., Optical Mass Data Storage II, Aug. 18–22, 1986, vol. 695, pp. 132–137, San Diego, Calif.
IBM Technical Disclosure Bulletin, Using Fine Servo For Managing Track Seeking on Optical Disks, Jan. 1988, vol. 30, No. 8, pp. 128–130, New York, USA.

Primary Examiner—Robert J. Pascal
Assistant Examiner—Tan Dinh
Attorney, Agent, or Firm—Staas & Halsey

[57] ABSTRACT

A positioner seek control system of a disk apparatus for seeking a target track on a medium by controlling a positioner during a positioner seek control period includes a tracking actuator accelerating unit for accelerating the tracking actuator in a seeking direction during a first predetermined period from the start time of the positioner seek control period, and a locking controlling unit for enabling the actuator locking means for a second predetermined period after the acceleration by the tracking actuator accelerating unit is finished. The first predetermined period, the second predetermined period, and the acceleration by the tracking actuator are determined so that the vector sum of the velocity of the positioner and the velocity of the tracking actuator after enabling the actuator locking means is in the seeking direction of the positioner.

10 Claims, 21 Drawing Sheets

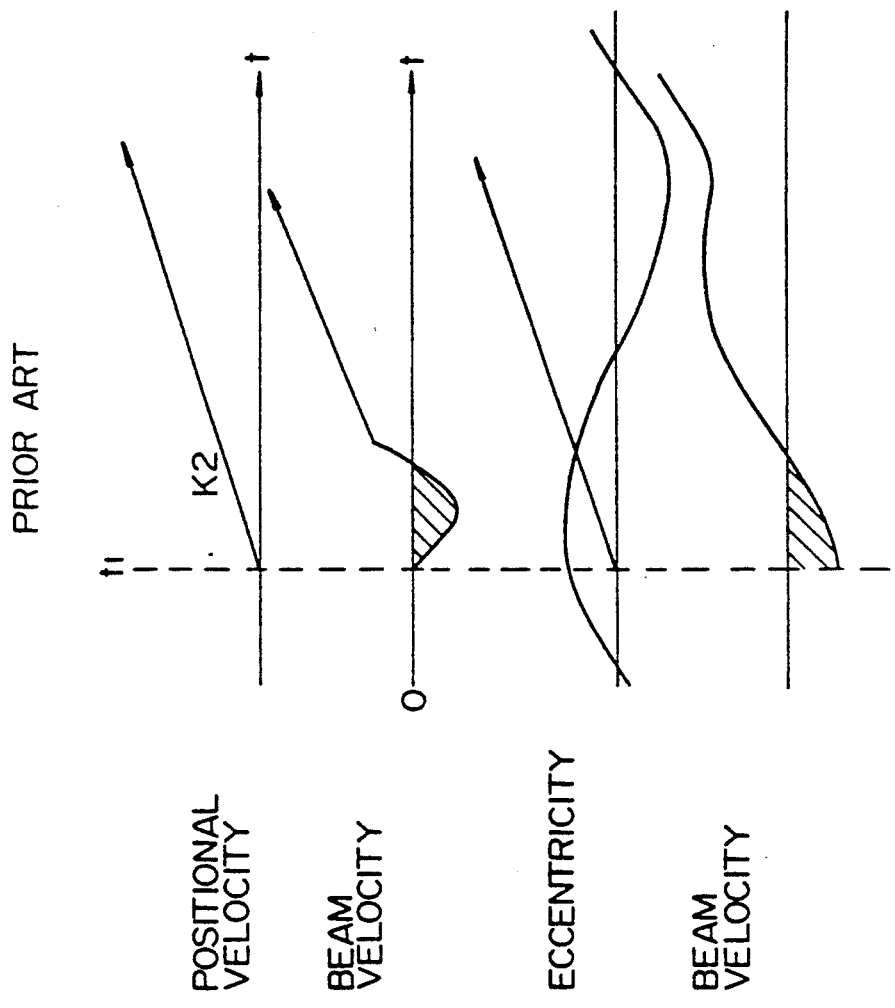

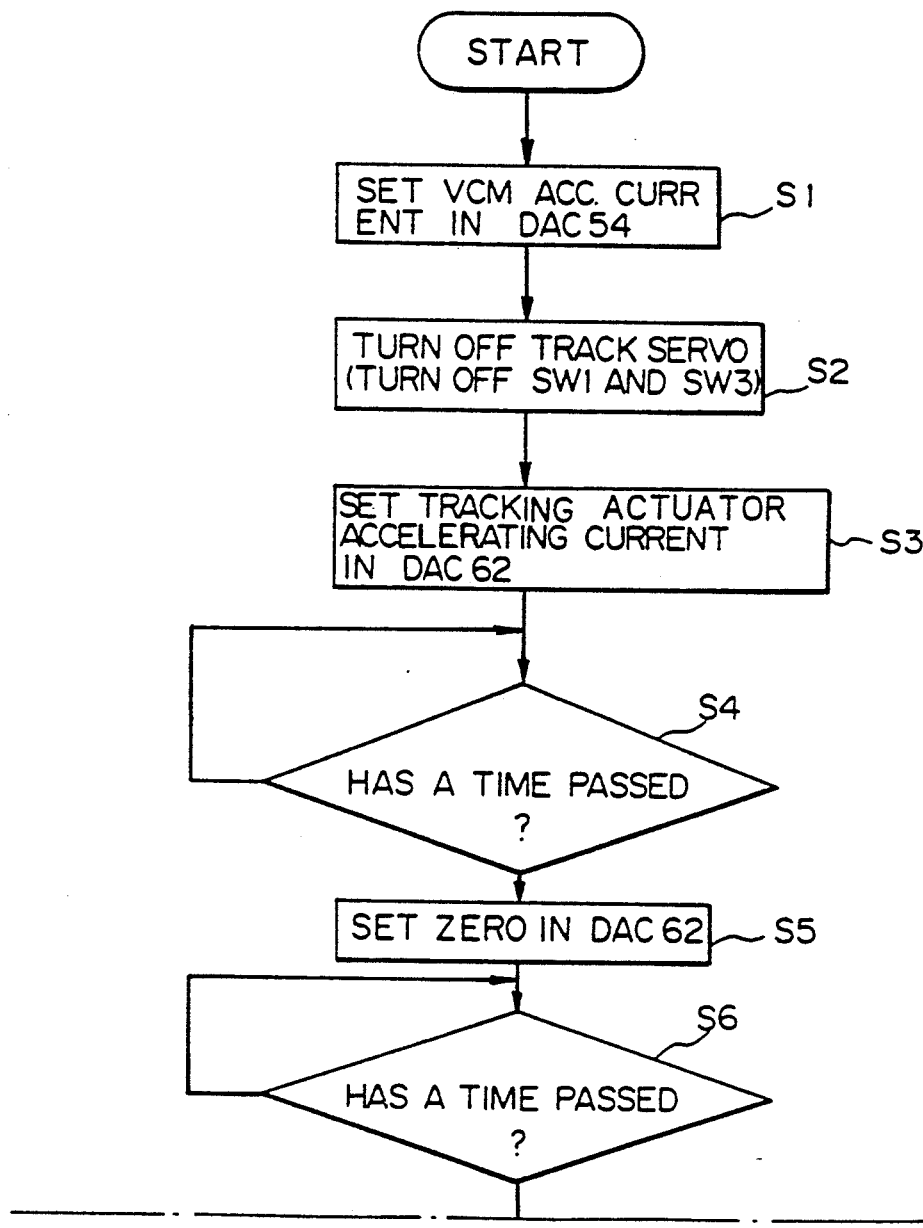

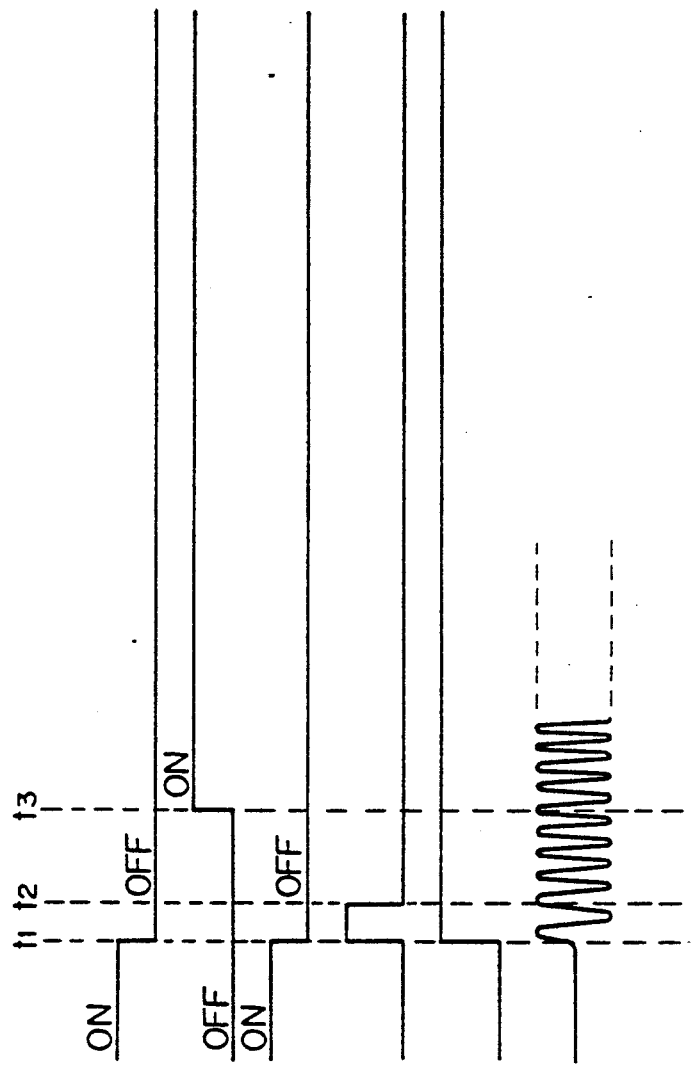

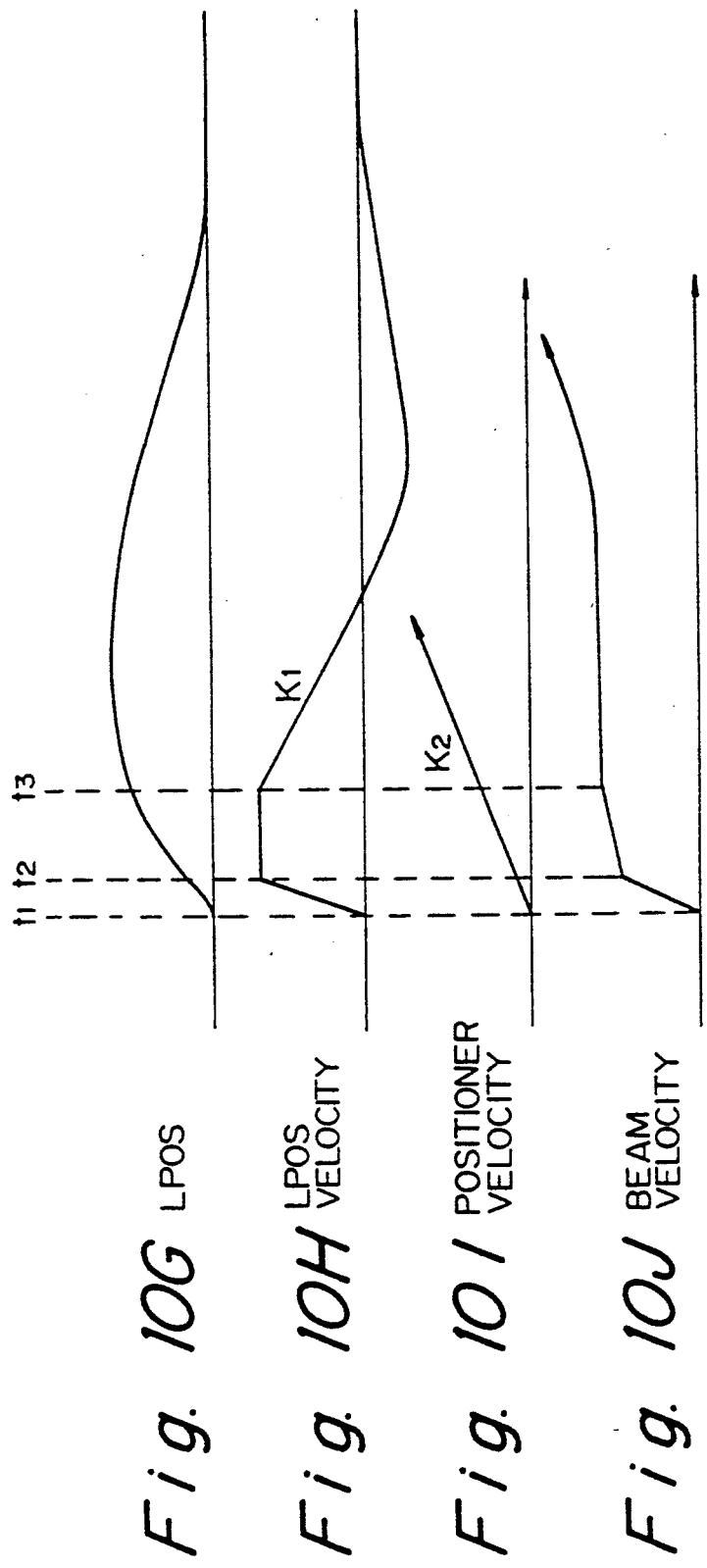
Fig. 10G LPOS
Fig. 10H LPOS VELOCITY
Fig. 10I POSITIONER VELOCITY
Fig. 10J BEAM VELOCITY

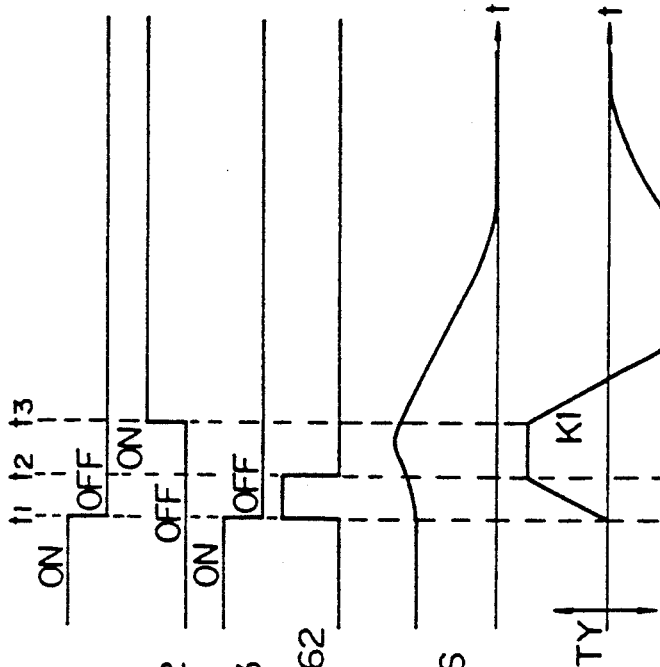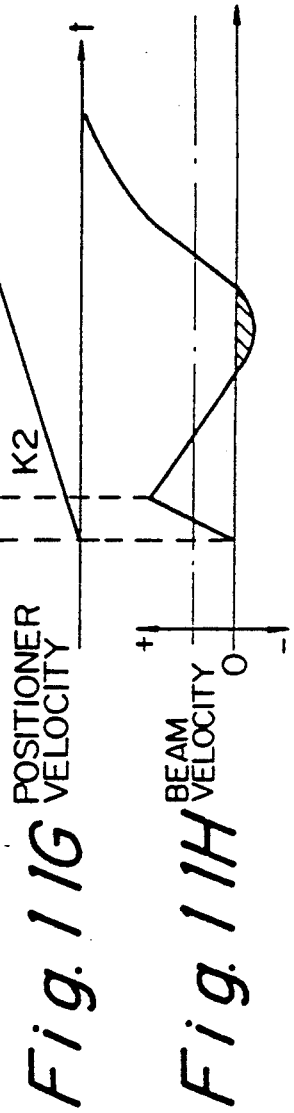
Fig. 11A SW1
Fig. 11B SW2
Fig. 11C SW3
Fig. 11D DAC 62
Fig. 11E LPOS
Fig. 11F LPOS VELOCITY
Fig. 11G POSITIONER VELOCITY
Fig. 11H BEAM VELOCITY

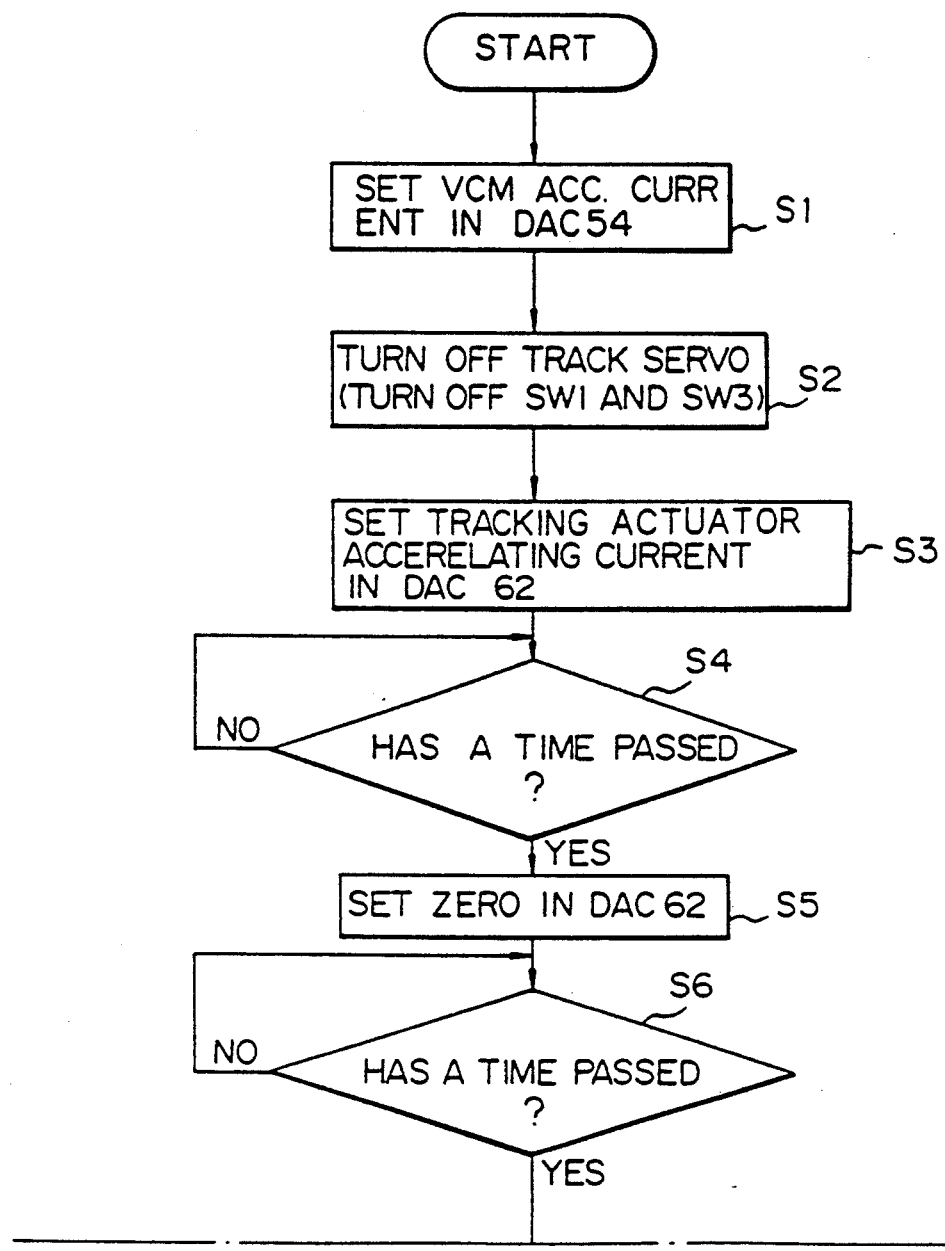

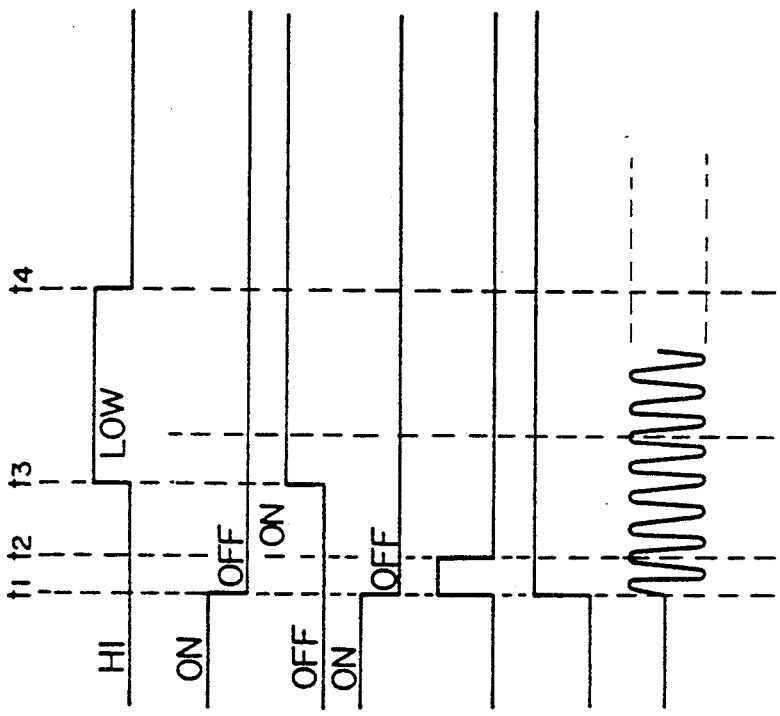

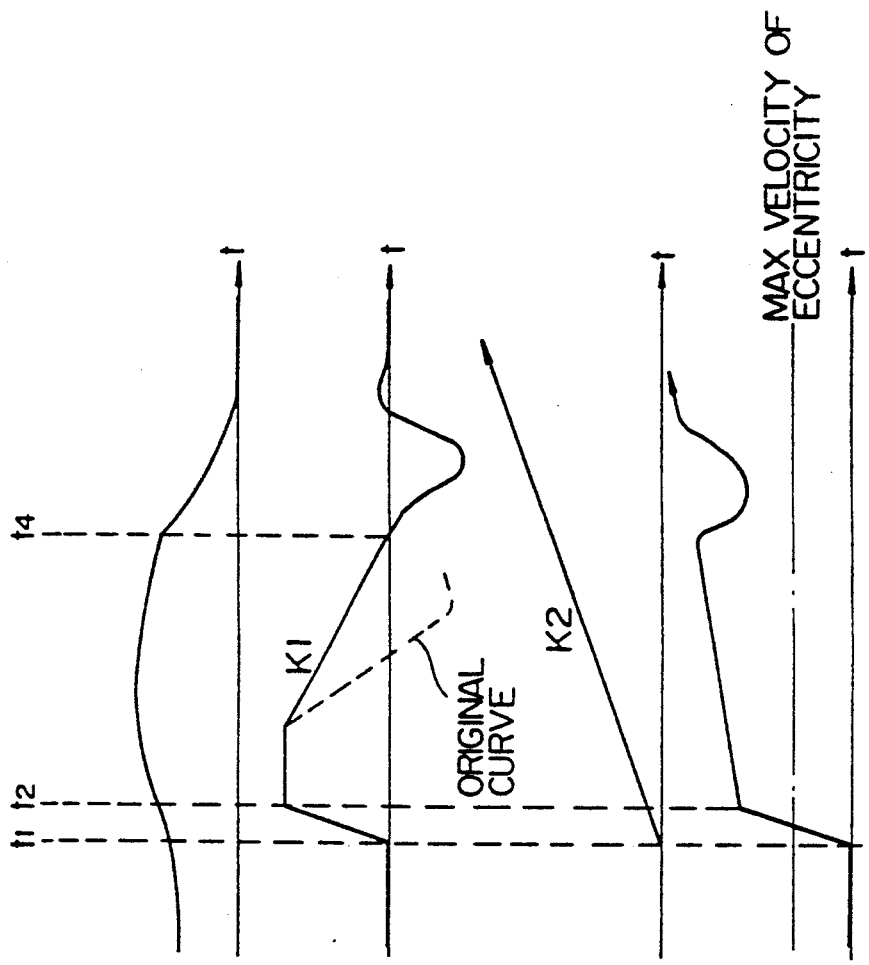

POSITIONER SEEK CONTROL SYSTEM OF A DISK APPARATUS AND METHOD FOR SCANNING A BEAM ACROSS A MEDIUM

CROSS REFERENCE TO RELATED APPLICATION

The subject application is related to U.S. Ser. No. 07/265,460 filed Oct. 11, 1988 and now U.S. Pat. No. 5,121,370.

BACKGROUND OF THE INVENTION

(1) Field of the Invention

The present invention relates to a positioner seek control system of a disk apparatus, and more particularly to a positioner seek control system of an optical disk apparatus for moving a light beam to a target track in a positioner seek mode in which an optical head is moved by a velocity control of a positioner which drives the optical head.

Generally, in a seek operation in an optical disk apparatus, the beam is moved from its actual position to a target track position. There are two kinds of seek operations, i.e., a lens seek operation and a positioner seek operation. When the distance between the actual position of an object lens and a target track position is as small as, for example, 0.1 mm or smaller, the lens seek operation is carried out by directly moving an object lens by means of a tracking actuator, wherein a positioner is activated to keep the object lens in its neutral position. When the distance is larger than 0.1 mm, for example, the positioner seek operation is carried out. In the positioner seek operation, the tracking actuator carrying the object lens is conventionally locked in its neutral position, and the positioner is activated to move the object lens close to the target track position. Once the object lens comes sufficiently close to the target track position, the lock is released and a fine control is carried out to follow an eccentricity of the rotating medium. The present invention relates to an improvement of the positioner seek control.

(2) Description of the Related Art

In a conventional positioner seek control of an optical disk apparatus, the number of tracks crossed by the beam during the seek operation is counted by using a tracking error signal (TES) so that the beam is made to accurately seek the target track position. This positioner seek operation is referred to as a direct track counting method. During this positioner seek operation, conventionally, the velocity of the positioner (VCM) is controlled in a state in which both a track servo circuit, which makes the beam follow the tracks, and a position servo circuit, which removes the influence of an eccentricity of a rotating medium or of an offset from a neutral position of the tracking actuator, are disabled, i.e., are turned off, and simultaneously a tracking actuator lock (or "trocking actuator lock servo") circuit for maintaining the tracking actuator at the neutral position is enabled, i.e., is turned on.

However, when the tracking actuator lock servo circuit is turned on simultaneously with the turning off of the track servo circuit and the position servo circuit, the tracking actuator starts to return to its neutral position if the tracking actuator is not already positioned at the neutral position. Since the positioner is not sufficiently accelerated at the beginning of the positioner seek operation, the beam may move in the reverse direction opposite to the target track due to the returning of the tracking actuator. As a result, a miscount of tracks may be effected, and therefore, to avoid the miscounting, the positioner seek operation cannot be finished by a single seek operation, but two or more seek operations may be necessary.

Accordingly, it has been desired to provide a positioner seek control system which does not produce a miscount of tracks at the start of a positioner seek operation.

SUMMARY OF THE INVENTION

An object of the present invention is to provide a positioner seek control system of a disk apparatus which can prevent a miscounting of tracks due to return of a beam at a start of a positoner seek operation so that a target track can be accessed by a single positioner seek operation.

To attain the above object, there is provided, according to the present invention, a positioner seek control system of a disk apparatus for recording or reproducing data onto or from a rotating medium by moving an object lens onto a target track of the rotating medium, and for seeking a target track on the medium by controlling a positioner during a positioner seek control period.

The system comprises a tracking actuator pivotally supported by an axis and having an end associated with the object lens, for moving the object lens perpendicular to the tracks to cross the tracks of the medium by rotating the tracking actuator around the axis. The system also includes a tracking actuator locking unit, operatively connected to the tracking actuator, for contolling the tracking actuator to be positioned on a neutral position within a movable range of the tracking actuator actuator, and a head for mounting the tracking actuator and the object lens, the positioner being associated with the head for moving the head in the direction to cross the tracks. Also, the system includes a positioner accelerating unit, operatively connected to the positioner, for accelerating the positioner during the positioner seek control period; a tracking actuator accelerating unit, operatively connected to the tracking actuator, for accelerating the tracking actuator in the seeking direction during a first predetermined period from the start time of the positioner seek control period and a locking controlling unit, operatively connected to the actuator locking unit, for enabling the actuator locking unit for a second predetermined period after the acceleration by the tracking actuator accelerating unit is finished. The first predetermined period, the second predetermined period, and the accerelation by the tracking actuator is determined in such a way that the sum of the velocity of the positioner and the velocity of the tracking actuator after enabling the actuator locking unit is in the seeking direction of the positioner.

It is preferable that the system further comprises an accelerating performance switching unit, operatively connected to the actuator locking unit, for lowering the acceleration performance of the tracking actuator by a predetermined amount during a third predetermined period after enabling the actuator locking unit, the predetermined amount of the acceleration performance of the actuator and the third predetermined period being determined in such a way that the sum of the velocity of the positioner and the velocity of the tracking actuator after enabling the actuator locking unit is in the seeking direction of the positioner.

BRIEF DESCRIPTION OF THE DRAWINGS

The above object and features of the present invention will be more apparent from the following description of the preferred embodiments with reference to the accompanying drawings, wherein

FIGS. 4A, 4B, 4C, 4D, 4E, 4F, 4G, 4H and 4I are operation timing charts for explaining the reason for the miscounting in the conventional positioner seek operation;

FIGS. 9A and 9B are an operation flowchart of the system shown in FIG. 7;

FIGS. 10A, 10B, 10C, 10D, 10E, 10F, 10G, 10H, 10I and 10J are operation timing charts of the system shown in FIG. 7;

FIGS. 11A, 11B, 11C, 11D, 11E, 11F, 11G and 11H are operation timing charts for explaining a problem in the first embodiment shown in FIG. 7;

FIGS. 16A and 16B is an operation flowchart of the system shown in FIG. 14; and

FIGS. 17A, 17B, 17C, 17D, 17E, 17F, 17G, 17H, 17I, 17J and 17K are operation timing charts of the system shown in FIG. 14.

DESCRIPTION OF THE PREFERRED EMBODIMENTS

For better understanding of the present invention, a conventional positioner seek control system and a problem therein will be first described with reference to FIG. 1 to FIGS. 4A to 4I.

Figure 1:
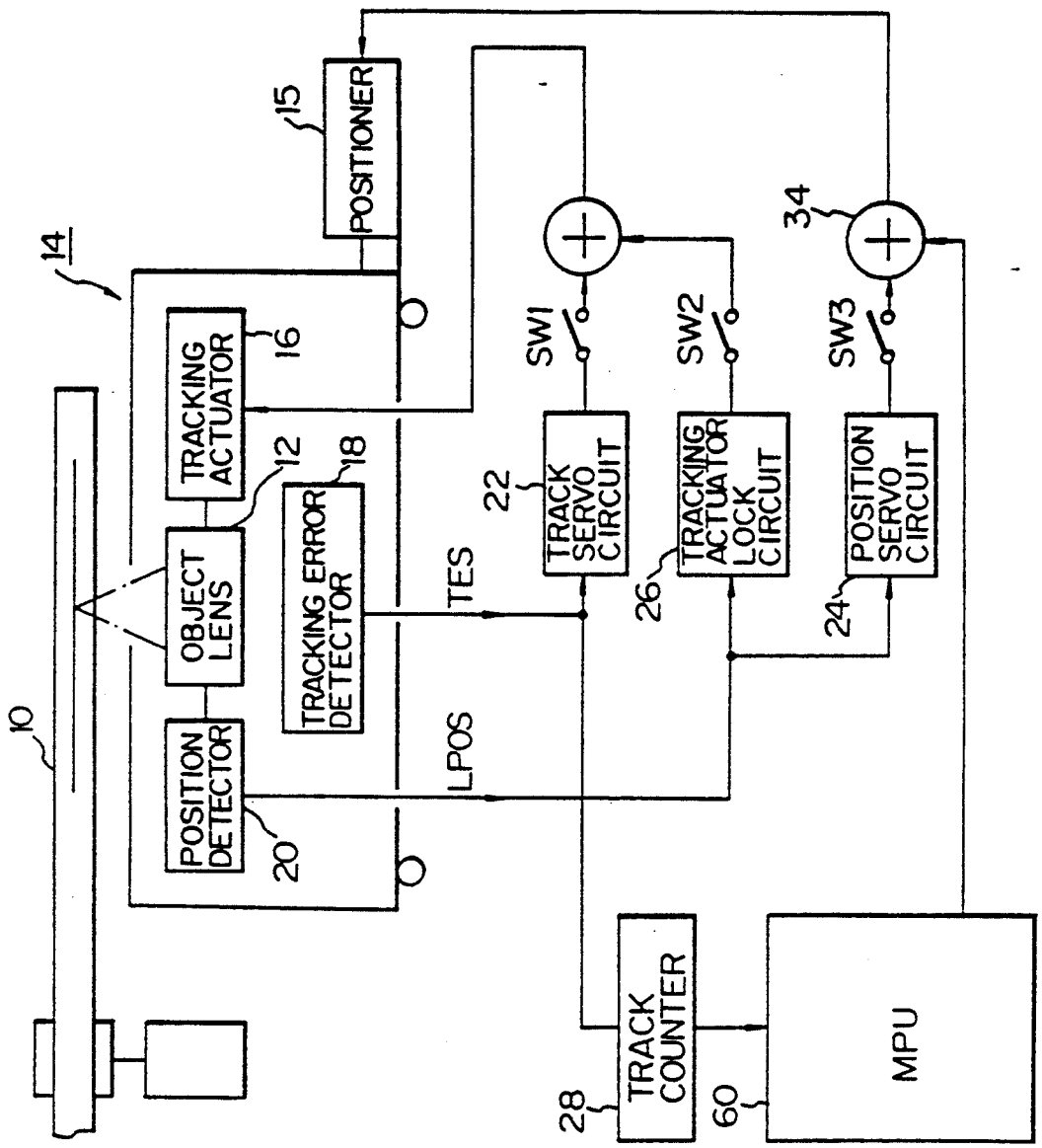
FIG. 1 is a block diagram showing a conventional seek control system.
Figure 2:
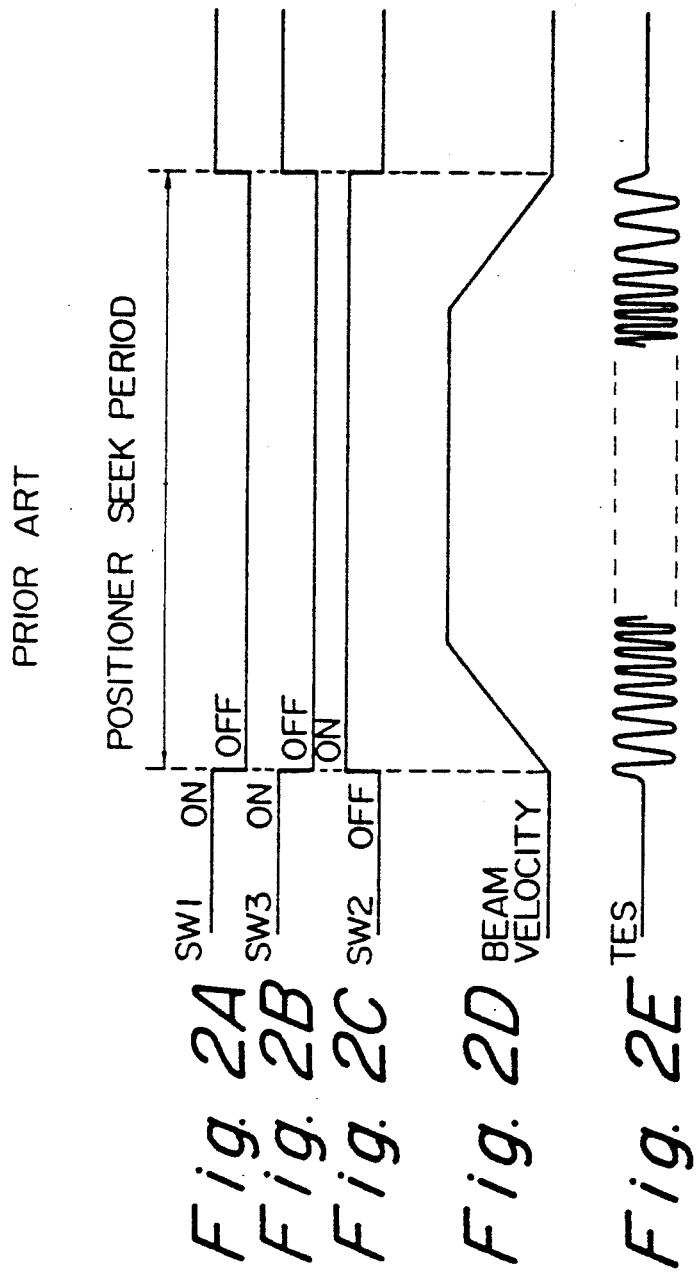
FIGS. 2A to 2E are operation timing charts of the conventional system shown in FIG. 1.

FIG. 1 is a block diagram of a conventional seek control system.

In FIG. 1, 14 is an optical head in which is mounted an object lens 12 for focusing a light beam on a medium 10 rotating at a constant speed. In the optical head 14, a tracking actuator 16, a tracking error detector 18, and a position detector 20 are also mounted.

The optical head 14 is moved by a positioner 15 utilizing a voice-coil motor (VCM) in the direction to cross the tracks on the medium 10. Namely, when the distance between the actual position of the optical head and the target track position is larger than 0.1 mm, the positioner 15 drives the optical head 14 to move it to the target track position under a positioner seek control in which the tracking actuator 16 is locked so as not to be moved. After the optical head 14 reaches the target track position, the lock of the tracking actuator 16 is released and the positioner 15 drives the optical head 14 under a fine control so that the optical head 14 follows an eccentricity of the medium 10.

When the distance between the actual position of the optical head and the target track position is smaller than 0.1 mm, the lock of the tracking actuator 16 is released so that the tracking actuator 16 makes the light beam move in the direction to cross the tracks under a lens seek control. As the tracking actuator 16, a two-dimensional oscillating actuator, a galvano mirror, and so forth may be used. As the tracking error detector 18, a two-division light receiving element is employed to receive a beam reflected from the medium 10 and to detect a tracking error signal (TES). Further, the position detector 20 detects the position of the tracking actuator 16 to output a lens position signal (LPOS). The lens position signal (LPOS) is a signal which becomes zero at the neutral position of the movable range of the actuator.

As the control means during the lens seek control in which the object lens is on track, there are provided a track servo circuit 22 for making the beam follow the target track by controlling the tracking actuator 16 based on the tracking error signal (TES), and a position servo circuit 24 for controlling the position of the optical head positioner 15 in such a way as to remove the effect of an eccentricity of the medium 10 or an offset of the tracking actuator 16 from the neutral position.

On the other hand, a tracking actuator lock circuit 26 is provided for locking the tracking actuator 16 at the neutral position during the positioner seek operation.

The tracking error signal (TES) is applied to a track counter 28. The track counter 28 counts, based on the tracking error signal (TES) during the positioner seek operation, the number of tracks passed by the beam.

Both the positioner seek operation and the lens seek operation are controlled by a microprocessor (MPU) 60.

The convetional positioner seek operation by the MPU 60 is carried out as follows.

As shown in the timing chart of FIGS. 2A to 2B, at the start of the positioner seek operation, the track servo circuit 22 and the position servo circuit 24 are disabled and the tracking actuator lock circuit 26 is enabled. In practice, switches SW1 and SW3 connected to the outputs of the track servo circuit 22 and the position servo circuit 24 are turned off and a switch SW2 connected to the output of the tracking actuator lock circuit 26 is turned on.

In this state, an accelerating voltage is applied from the MPU 60 to an adder 34 to effect an acceleration control of the positioner 15 to accelerate the beam. After the beam velocity reaches the maximum velocity, the MPU 60 controls the positioner 15 to move the beam at a constant velocity. When the remaining number of tracks to the target track becomes a predetermined value, the MPU 60 controls the positioner 15 to decelerate the beam. When the beam reaches the target track, the MPU 60 carries out the lens seek control by turning off the tracking actuator lock circuit 26 and simultaneously turning on the track servo circuit 22 and the position servo circuit 24.

Note that it may be possible to enable the track servo circuit 22 immediately before the beam reaches the target track. In this case, the MPU 60 may apply decelerating pulses at the position of the target track to stop the beam, whereby the beam is rapidly introduced onto the target track.

In such a conventional positioner seek control as mentioned above, however, there was a problem in that, at the positioner seek starting time, from the time when the tracking actuator lock circuit 26 is enabled until the time when the beam velocity reaches a predetermined value, the tracking actuator 16 may return to its neutral position if the tracking actuator 16 is deviated from the neutral position at the positioner seek starting time. By this returning of the tracking actuator 16, the track counter 28 may miscount the number of tracks. Therefore, a seeking operation could not be effected accurately.

Figure 3:
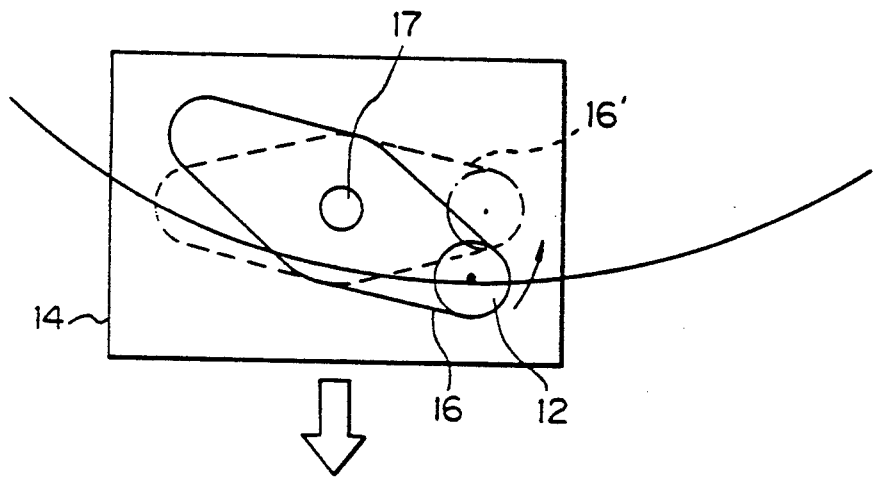
FIG. 3 is a diagram for explaining the returning movement of a tracking actuator at the start of the positioner seek operation.
Figures 4A, 4B, 4C, 4D, 4E:
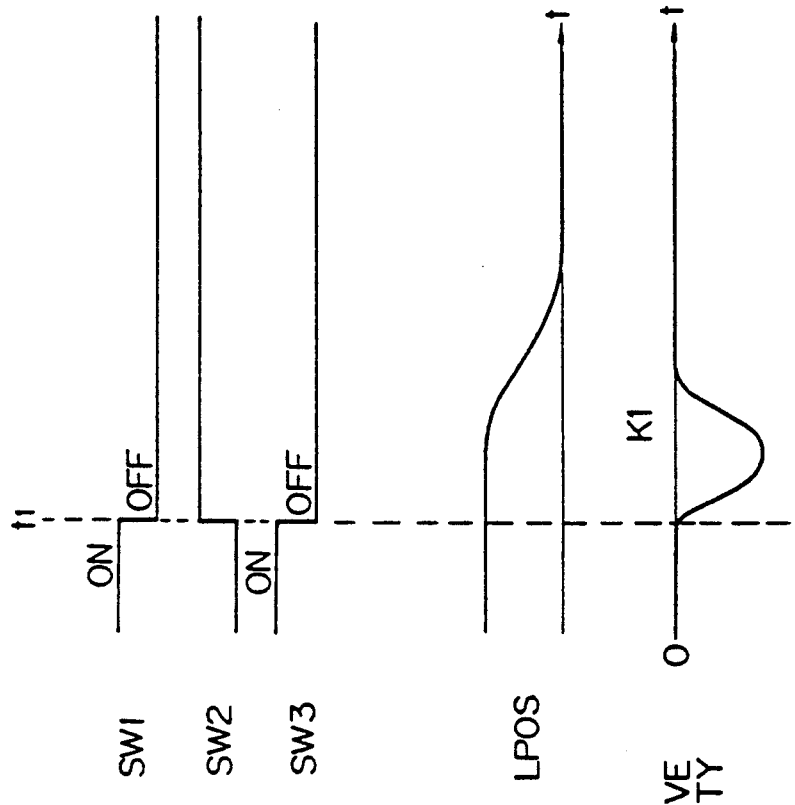

Namely, in an optical disk apparatus of a double servo system, as shown in FIG. 1, at the start of the positioner seek operation, the track servo circuit 22 for controlling the tracking actuator 16 and the position servo circuit 24 for controlling the positioner 15 are simultaneously disabled, and the tracking actuator lock circuit 26 is enabled accompanied by the enabling of the track servo circuit 22 and the position servo circuit 24. When the tracking actuator lock circuit 26 is enabled, the lock state of the tracking actuator 16 is released so that the tracking actuator 16 may be free to rotate around its center so as to return to the neutral position. Therefore, as shown in FIG. 3 by a solid line of the tracking actuator 16, if the tracking actuator 16 in a track servo state immediately before starting the positioner seek operation deviates from the neutral position in the same direction as the seek direction, the lens position signal LPOS is not zero at the start time t1 as shown in FIG. 4D, and the tracking actuator 16 starts to be returned to its neutral position as shown in FIG. 3 by a dotted line 16'. In this case, the relative velocity of the beam caused by the returning movement of the tracking actuator 16 is negative as shown in FIG. 4E. On the other hand, the MPU 60 starts to accelerate the positioner 15 in the direction of the arrow shown in FIG. 3 so that the velocity of the positioner 15 linearly increases as shown in FIG. 4F. However, since the accelerating performance of the positioner 15 by the MPU 60 is low with respect to that of the tracking 16 by the enabling of the tracking actuator lock circuit 26, the tracking actuator 16 crosses the tracks in the reverse direction opposite to the seeking direction when it returns to the neutral position 16', and tracks are erroneously counted as shown in FIG. 4G by slashed lines by this amount.

Further, when an acceleration of the medium due to an eccentricity of the medium is large with respect to the acceleration of the positioner 15 by the MPU 60 as shown in FIG. 4H, the aceleration which provides the movement in the seek direction of the track due to the eccentricity may exceed the acceleration of the positioner 15, so that the tracks are counted erroneously as shown in FIG. 4I by slashed lines until the velocity of the positioner 15 exceeds the track velocity due to the eccentricity.

In this way, when the tracks are erroneously counted at the start of the seek, two or more positioner seek operations must be carried out until the target track is reached so that there was a problem of long access time.

The present invention has been provided in view of the above conventional problem, and has an object to provide a positioner seek control system of an optical disk apparatus which can prevent a miscounting of tracks due to return of a beam at a seek start so that a target track can be accessed by a single positioner seek operation.

Embodiments of the present invention will be described in the following.

Figure 5:
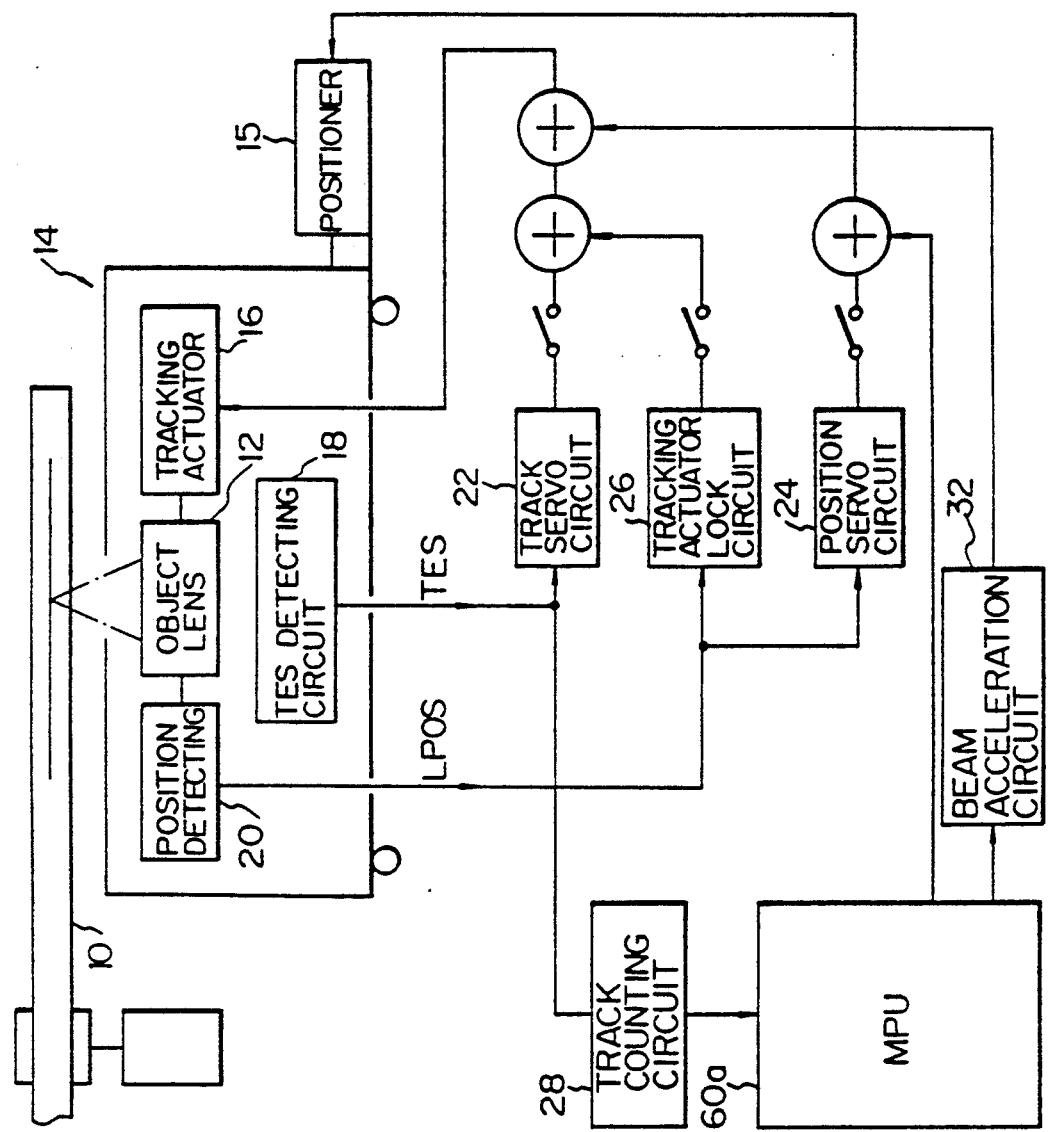
FIG. 5 is a principal block diagram of a seek control system according to an embodiment of the present invention.

FIG. 5 is a principal block diagram for explaining the present invention.

The subject of the present invention is a positioner control system of an optical disk apparatus shown in FIG. 5, wherein 14 is an optical head for radiating a beam, through an object lens 12, onto a medium 10 rotating at a constant speed; 16 is a tracking actuator mounted on the optical head 14, for moving the optical beam through the object lens 12 in the direction to cross tracks within a movable range. The tracking actuator 16 is pivotally supported by an axis 17 as shown in FIG. 3 and having an end associated with the object lens 12. The end of the tracking actuator 16 is rotatable around the axis so that the light beam crosses the tracks on the rotating medium 10. Reference 15 is a positioner for moving the optical head 14 in the direction to cross the tracks; 18 is a tracking error (or "TES") detecting unit for receiving the reflected beam from the medium 10 to detect a tracking error signal (TES); 20 is a position detecting circuit for detecting the position of the tracking actuator 16 to output a lens position signal (LPOS); 22 is a track servo circuit for controlling the tracking actuator 16 to make the beam follow the tracks; 24 is a position servo circuit 24 for controlling the position of the positioner 15 to remove an offset of the tracking actuator 16 accompanied by its track movement; 26 is a tracking actuator lock circuit for controlling the tracking actuator 16 to be positioned at a center of its movable range; 28 is a track counting circuit for counting the number of tracks crossed by the beam, based on the tracking error signal (TES); and 60a is a microprocessor for controlling the velocity of the positioner 15 in the direction toward the target track position, when the track servo circuit 22 and the position servo circuit 24 are both in OFF states and the tracking actuator lock circuit 26 is in an ON state, and for ending the velocity control at a time or close to the time when the detected track number from the track counting circuit 28 coincides with the target track to introduce the positioner onto the target track.

In such a positioner seek control system, according to an embodiment of the present invention, there is provided a beam accelerating (or "beam acceleration") circuit 32 for forcedly and temporarily moving the tracking actuator 16 to the seeking direction. The MPU 60a turns the tracking actuator lock circuit 26 on after a predetermined time period has passed from the end of the acceleration by the beam accelerating circuit 32.

Here, the beam accelerating circuit 32 supplies an accelerating voltage to the tracking actuator 16 during a period from the start of the seek operation until the moving velocity exeeds a regulation value.

In addition, the beam accelerating circuit 32 supplies an accelerating voltage to the tracking actuator 16 during a predetermined time period from the start of the seek operation.

Further, as a servo frequency band of the tracking actuator lock circuit 26, the servo frequency band is determined in such a way that the accerelation $K_1$ to return to the neutral position when the tracking actuator lock circuit 26 is turned on after starting the seek operation is lower than the acceleration $K_2$ of the positioner 15 at that time.

The operation of the system shown in FIG. 5 is described next with reference to FIGS. 6A to 6E.

Figure 6:
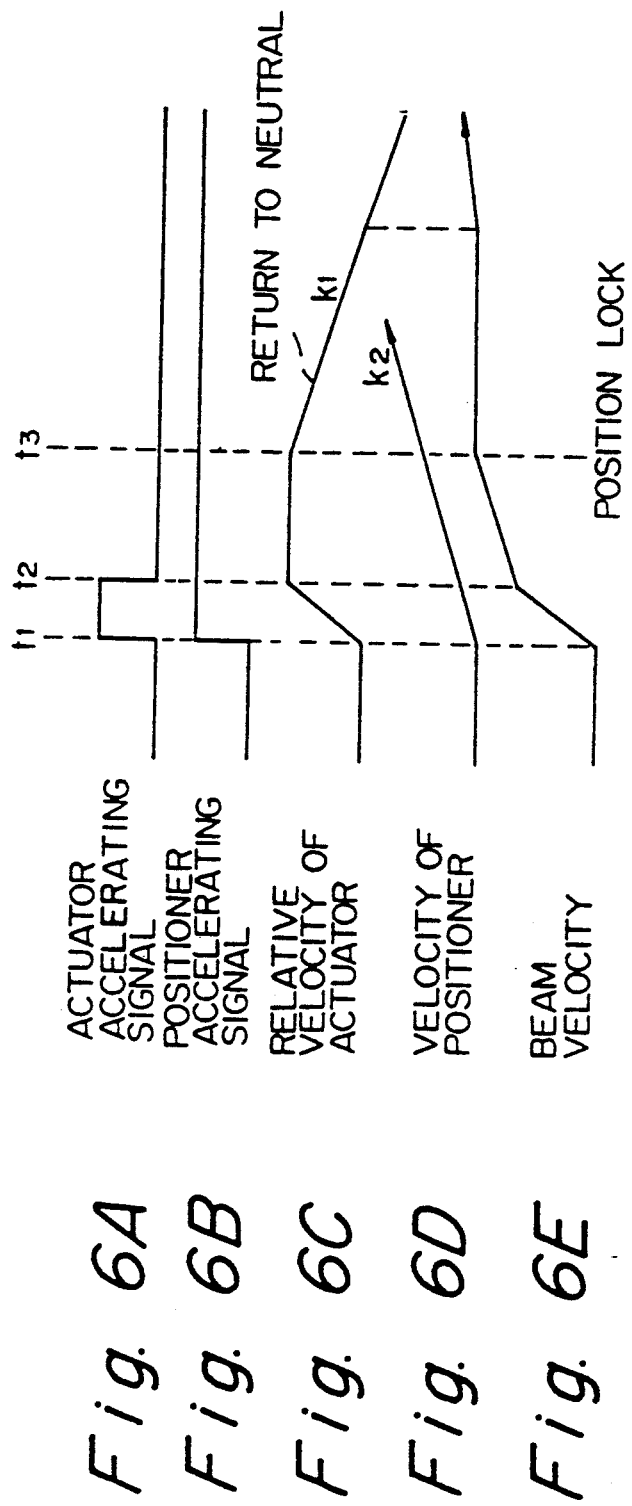
FIGS. 6A, 6B, 6C, 6D and 6E are operation timing charts of the seek control system shown in FIG. 5.

In FIG. 6A, at the start time t1 of the positioner seek operation, simultaneous with the acceleration of the positioner 15 by the positioner accelerating signal shown in FIG. 6B from the MPU 60a, the tracking actuator 16 also is forced to be accelerated in the seek direction during a period between t1 and t2 as shown in FIG. 6C so that the beam is moved in the seek direction as shown in FIG. 6E with the aid of the tracking actuator 16.

Since the tracking actuator 16 has a response performance which enables it to follow the track eccentricity when it is on track, its accelerating performance is naturally higher than the track eccentricity of the medium 10. Therefore, since the tracking actuator lock servo 26 is turned on after accelerating the beam by the beam accelerating circuit 32 so that the beam has a greater velocity than the eccentricity velocity of the medium 10, a miscounting of tracks due to the eccentricity does not occur.

Also, by setting the frequency band of the tracking actuator lock circuit 26 to be relatively low, and by setting the acceleration $K_1$ of the tracking actuator 16 due to the recovery force after the tracking actuator lock circuit 26 is turned on at a time t3 to be lower than the acceleration $K_2$ of the positioner 15 after the time t3 as shown in FIGS. 6C and 6D, the miscounting of tracks, which may occur in the process when the beam is forced to be returned to the central position of the lens (the neutral position of the actuator) by activation of the tracking actuator lock circuit 26 accompanied by deactivation of the track servo, can be surely prevented.

Figure 7:
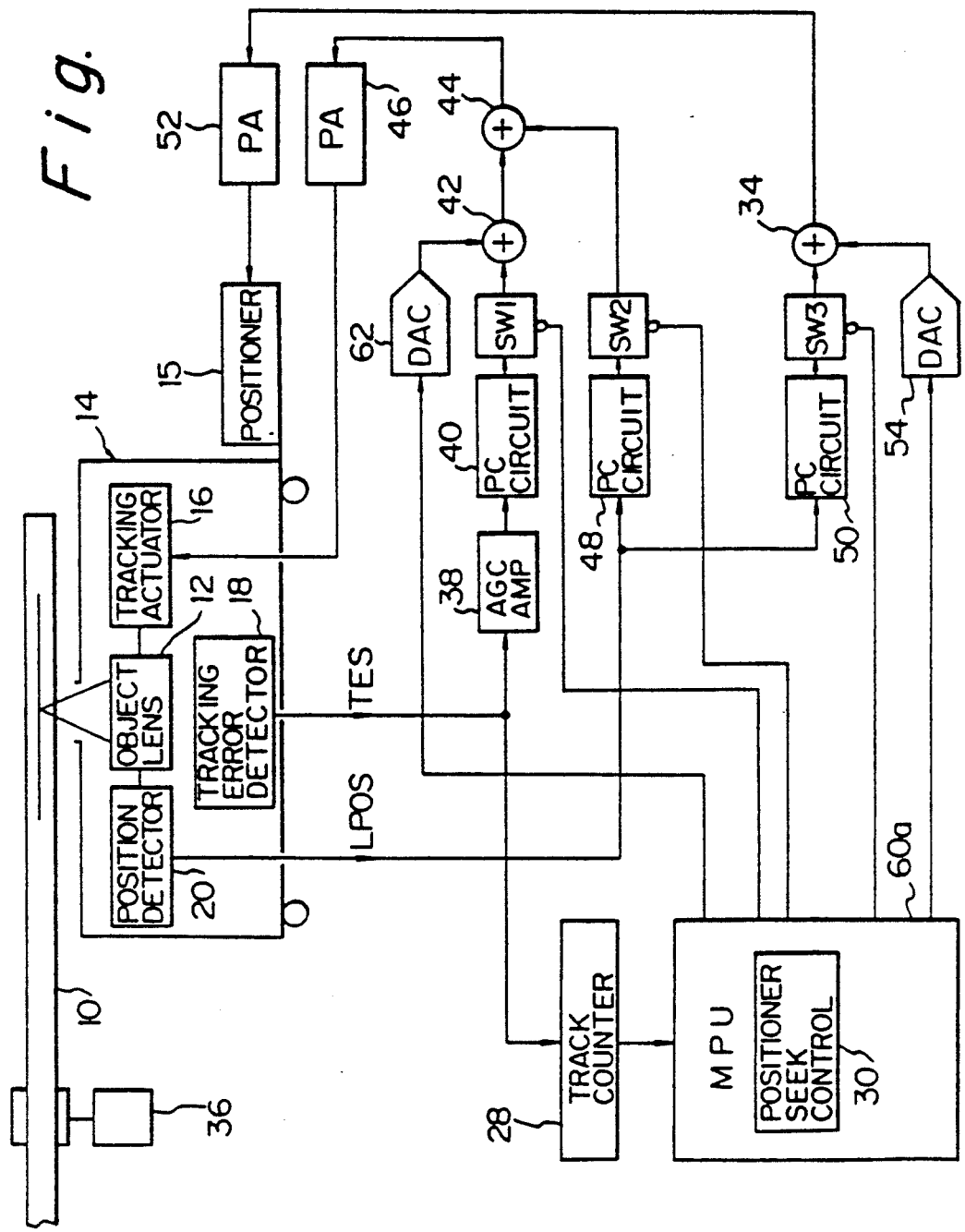
FIG. 7 is a detailed block diagram of the seek control system shown in FIG. 5.

FIG. 7 is a detailed block diagram of the embodiment shown in FIG. 5.

In FIGS. 5 and 7, the same reference numerals represent the same parts. Namely, 10 is a medium which is, in this embodiment, an optical disk rotated at a constant velocity by a spindle motor 36. As an alternative to the optical disk 10, a magneto-optic disk may also be employed.

Under the optical disk 10, an optical head 14 is provided to be movable in the direction to cross the tracks by a VCM positioner 15. In the optical head 14, an object lens 12, a tracking actuator 16, a position detecting unit (or "position detector") 20 and a tracking error detecting unit (or "tracking error detector") 18 are mounted.

Figure 8:
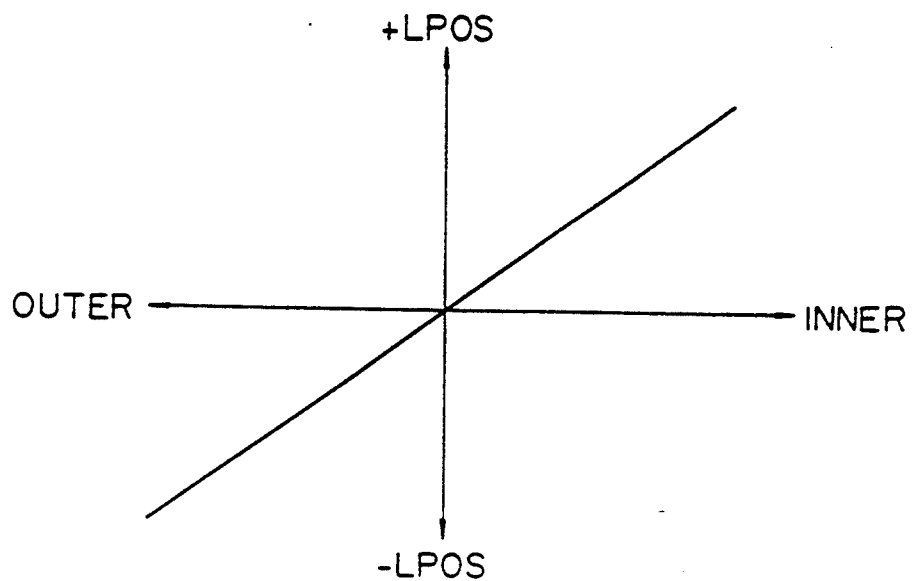
FIG. 8 is a characteristic diagram of a detected signal of a position detector utilized in the embodiment of the present invention shown in FIG. 7.

Namely, the object lens 12 concentrates the light beam obtained by the head optical system to radiate a fine beam spot onto the medium surface of the optical disk 10, and passes the reflected light of the radiated beam spot onto the head optical system. The tracking actuator 16 drives the object lens 12 to move the beam to the direction to cross the tracks of the optical disk 10. As the tracking actuator 16, an appropriate tracking actuator such as a one-dimensional rotation type which carries out only tracking, a two-dimensional oscillating type which carries out tracking and focusing simultaneously, or galvano mirror can be employed. The tracking error detecting unit 18 receives a light reflected from the optical disk 10 to output a tracking error signal (TES). For example, the tracking error signal detector 18 is provided with a two-division light receiving element to generate the tracking error signal TES based on a push-pull method (far-field method). Further, the position detector 20 is one for detecting the position of the object lens 12 which is driven by the tracking actuator 16, generating a lens position signal LPOS which is, as shown in FIG. 8, 0 at the central position of the movable range of the tracking actuator 16, increased in the plus direction along with the inner side of the disk 10, and increases in the minus direction along with the outer side of the disk 10.

The tracking error signal TES from the tracking error signal (or "tracking error") detector 18 is applied to an automatic-gain control (AGC) amplifier 38, and then to a phase compensating circuit (PC circuit) 40. The phase compensating circuit 40 compensates a phase advance in a high frequency part of the tracking error signal TES to increase the gain at the high frequency part. The output of the phase compensating circuit 40 is applied through a servo switch SW1, adders 42 and 44, and a power amplifier 46 to the tracking actuator 16. The tracking error detecting unit 18, the AGC amplifier 38, the phase compensating circuit 40, the servo switch SW1, the adders 42 and 44, the power amplifier 46 and the tracking actuator 16 constitute a track servo loop (the track servo circuit 22 in FIG. 5).

The lens position signal LPOS from the position detector 20 is applied to a phase compensating circuit 48, and the output of the phase compensating circuit 48 is applied through a servo switch SW2 to an adder 44 in the track servo loop. The position detector 20, the phase compensating circuit 40, the servo switch SW2, the adder 44, the power amplifier 46, and the tracking actuator 16 form a tracking actuator lock loop (the tracking actuator lock circuit 26 in FIG. 5) for maintaining the tracking actuator 16 at its neutral position.

Further, the lens position signal LPOS from the position detecting circuit 20 is applied to a phase compensating circuit 50, and the output of the phase compensating circuit 50 is applied through a servo switch SW3, an adder 34, and further a power amplifier 52 to the VCM (or "positioner") 15. A position control voltage from an MPU 60a and converted by a DA converter 54 and applied to the adder 34. Using the acceleration control voltage from the MPU 60a converted by the DA converter 54, the velocity control of the positioner 15 during the positioner seek operation is carried out. The output of the phase compensating circuit 50 is the position control signal for following the eccentricity of the optical disk 10, or the deviation of the tracking actuator 16 from the neutral position, namely the position control voltage and so forth for compensating for an offset. The position detecting unit 20, the phase compensating circuit 50, the servo switch SW3, the adder 34, the power amplifier 52, and the VCM positioner 15 form a position servo loop (the position servo circuit 24 in FIG. 5).

Further, in the MPU 60a, a positioner seek control unit 30 realized by a program control is provided. To make it possible to effect a seek operation by the positioner seek control unit 30, a track counter 28 is provided. The track counter 28 counts, based on the tracking error signal TES from the tracking error detector 18, the number of tracks crossed by the beam during a seek operation. In practice, the number of zero crosses of the tracking error signal TES which changes sinusoidally each time it crosses a track, is detected.

The MPU 60a turns off the servo switches SW1 and SW3 during a seek operation to cut the track servo loop and the position servo loop. At this time, conventionally, the servo switch SW2 is simultaneously turned on to make the tracking actuator lock servo effective, however, according to the embodiment of the present invention, even when the track servo side is disabled, the tracking actuator lock servo is not immediately enabled, but by the use of a DA converter 62 and an adder 42 newly provided as the beam accelerating (or "beam acceleration") circuit 32 in FIG. 5, an accelerating voltage is temporarily applied to the tracking actuator 16 under the control of the MPU 60a. When a predetermined time period has passed after the end of the acceleration of the tracking actuator 16 by the accelerating voltage from the DA converter 62 to the adder 42, the servo switch SW2 is turned on to start the tracking actuator lock servo. Up to the time when the servo switch SW2 is turned on to start the tracking actuator lock servo, the velocity of the tracking actuator 16 and the velocity of the positioner 15 have been sufficiently increased by the MPU 60a through the DAC 62 and the adder 42 and by the MPU 60a through the DAC 54 and the adder 34 respectively, the returning movement of the tracking actuator 16 will not cause the problem of miscounting of the tracks.

Further, as a servo frequency band of the tracking actuator lock servo loop including the phase compensating circuit 48, the servo frequency band is set to be rather low in such a way that a recovery acceleration $K_1$ to the neutral position of the tracking actuator 16 when the servo switch SW3 is turned on to effect the tracking actuator lock servo after the start of the seek is made to be lower than the acceleration $K_2$ of the VCM positioner 15 at that time, i.e., $K_1 < K_2$.

Next, the positioner seek operation according to the embodiment shown in FIG. 7 will be described with reference to an operation flow chart of FIGS. 9A and 9B and an operation timing chart shown in FIGS. 10A-10J.

First, in an on-track state on an appropriate track, the servo switches SW1 and SW3 are in their on states so that both the track servo and position servo are effected, and the tracking actuator lock servo is released by the servo switch SW2 being OFF. Therefore, by the control of the phase compensating circuit 40, the tracking actuator 16 controls the light beam to trace the target track. Simultaneously, the position control signal depending on the offset of the actuator generated by the position detecting circuit 20 and/or the deviation of the optical disk 10 is given through the phase compensating circuit 50 to the adder 34, and further through the power amplifier 52 to the VCM positioner 15, the VCM positioner 15 controls the optical head 14 to effect a position control in such a way as to remove the effect of the eccentricity of the disk or the offset of the tracking actuator 16.

Figure 9B:
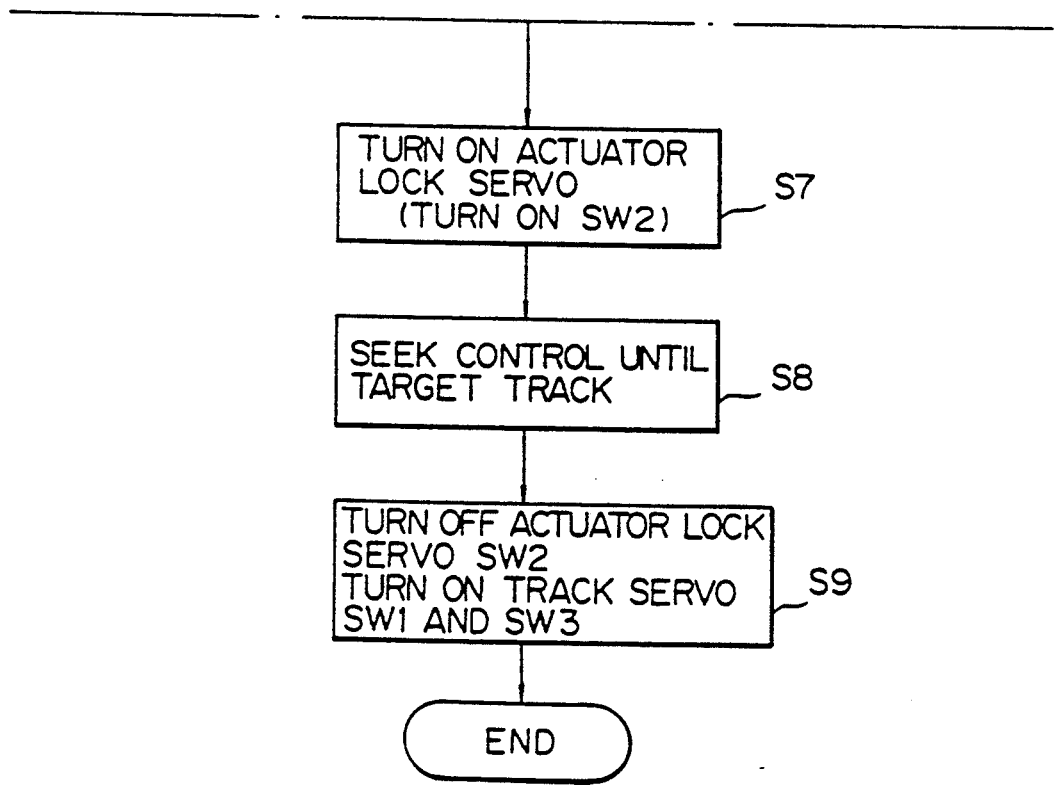

In this state, when an instruction is given from a higher level apparatus to the MPU 60a to access another arbitrary track, the positioner seek control unit 30 is activated to carry out a seek operation according to the flowchart of FIGS. 9A and 9B.

In FIG. 9A, the MPU 60a sets an accelerating current in the DA converter 54 for the VCM positioner 15, and then, at S2, turns off the track servo. Namely, the servo switches SW1 and SW3 are turned off. Further, at S3, the MPU 60a sets an accelerating current in the DA converter 62 for the tracking actuator 16. Since the processings of S1 to S3 are carried out in a very short time, the servo switches SW1 and SW3 are turned off at the start of the seek operation, as shown at a time t1 in FIG. 5, and simultaneously accelerating currents for the tracking actuator 16 and the VCM positioner 15 are set by the outputs of the DA converters 54 and 62.

Then, at S4, it is checked whether or not a constant time has passed for waiting until the acceleration of the tracking actuator 16 has finished, and, when the constant time for finishing the acceleration of the tracking actuator 16 has passed, the process proceeds to S5 to set the accelerating current of the tracking actuator by the DA converter 62, to zero. Namely, as shown at a time t2 in FIGS. 10A-10J, the output of the DA converter 62 is set to zero. By the acceleration control of the tracking actuator 16 between the times t1 and t2, the lens position signal LPOS indicating the relative position with respect to the optical head 14 moves in the seek direction, generating a LPOS velocity corresponding to the position signal LPOS, namely the relative velocity of the tracking actuator 16 with respect to the optical head 14, the LPOS velocity being kept almost constant after the acceleration up to the time t2. During this time, the positioner velocity continues to rise due to the accerelation control of the VCM positioner 15 by the DA converter 54.

Referring to FIGS. 9A and 9B again, at S5, after zero is set in the DA converter 62, the process proceeds to S6 to wait for a constant time period until the VCM positioner 15 is accelerated. At S6, when the constant time has passed, namely when the optical head 14 is sufficiently accelerated by the VCM positioner 15, the tracking actuator lock servo is enabled by turning on the servo switch SW2. By the enabling of the tracking actuator lock servo, as shown in and after the time t3 in FIGS. 10A-10J the tracking actuator 16 which has been moving in the seek direction receives the tracking actuator lock control to return in the opposite direction, namely to the neutral position, so that it is locked in the position in a state in which the lens position signal LPOS is zero and the LPOS velocity is zero.

At this time t3 and after the time t3, since the servo frequency band of the tracking actuator lock servo is set to be so low that the acceleration for pulling the tracking actuator 16 into the neutral position, namely, the recovery acceleration $K_1$ when the LPOS velocity decreases from the time t3, and the acceleration $K_2$ of the positioner velocity at this time has the relation $K_1 < K_2$, the tracking actuator 16 is returned slowly with respect to the movement of the optical head 14 in the seek direction by the VCM positioner 15, so that the miscounting of tracks, which may occur when the tracking actuator 16 returns to the neutral position, can be surely prevented.

Referring to FIG. 9, again, at S7, when the tracking actuator lock servo is enabled, the process proceeds to S8, and a seek operation is carried out until the target track is reached. In practice, the remaining number of tracks to the target track is determined from the number of tracks crossed by the beam and counted by the track counter 28, and, when the remaining number of tracks becomes zero, it is known that the target track is reached so that at S9, the tracking actuator lock servo is disabled and simultaneously the track servo is turned on to introduce the beam onto the target track by means of the track servo. Alternatively, to ensure the introduction of the beam onto the target track, it may be possible to turn off the tracking actuator lock servo at the final stage of the deceleration control of the VCM positioner 15 before the position on the target track, to carry out a parallel lens seek operation by means of the tracking actuator 16, to apply a deceleration pulse to the tracking actuator 16 when the target track is reached, to stop it, and at that time, to turn on the positioner position servo to finish the seek operation.

As described above, according to the above-described embodiment of the present invention, since the miscounting of tracks at the positioner seek starting time can be surely prevented, positioning to a target track becomes possible by a single seek operation, so that access time can be shortened.

In the above described embodiment of the present invention, however, there may still be a problem described as follows with reference to FIGS. 11A to 11H. Namely, according to the first embodiment, when the tracking actuator lock circuit 22 is enabled at a time t2 after a predetermined time period from the disabling of the track servo circuit 22 and the position servo circuit 24 at a time t1 as shown in FIGS. 11A, 11B and 11C, if the acceleration $K_1$ of the tracking actuator 16 by the tracking actuator lock circuit 22 is much larger than the acceleration $K_2$ of the positioner 15 as illustrated in FIGS. 11F and 11G, the beam velocity will be negative, i.e., it will have a direction opposite to the seeking direction, as shown in FIG. 11H by slash lines. In this case, the same problem of miscounting of tracks occurs. In more detail, the accelerating performance for the positioner 15 is generally as low as ⅓ to ¼ with respect to the accelerating performance for the tracking actuator 16. Therefore, the returning acceleration $K_1$ of the tracking actuator 16 to the neutral position by enabling the tracking actuator lock circuit 26 after at the time t2, is larger than the acceleration $K_2$ of the positioner 15 after the time t2, when in particular the lens position signal LPOS deviates greatly from the neutral position as shown in FIG. 11E. As a result, the beam velocity obtained by the sum of the relative velocity of the beam (LPOS velocity) and the positioner velocity becomes negative as illustrated in FIG. 11H so that the beam moves in the reverse direction opposite to the seek direction, causing a miscounting of the tracks. Further, even when the beam is not returned in the reverse direction, the beam velocity is lowered so that it becomes lower than the maximum velocity due to the eccentricity of the disk 10, and there remains a problem of miscounting of the tracks due to the eccentricity of the medium.

To overcome the above problem in the first embodiment of the present invention, a second embodiment of the present invention is provided.

Figure 12:
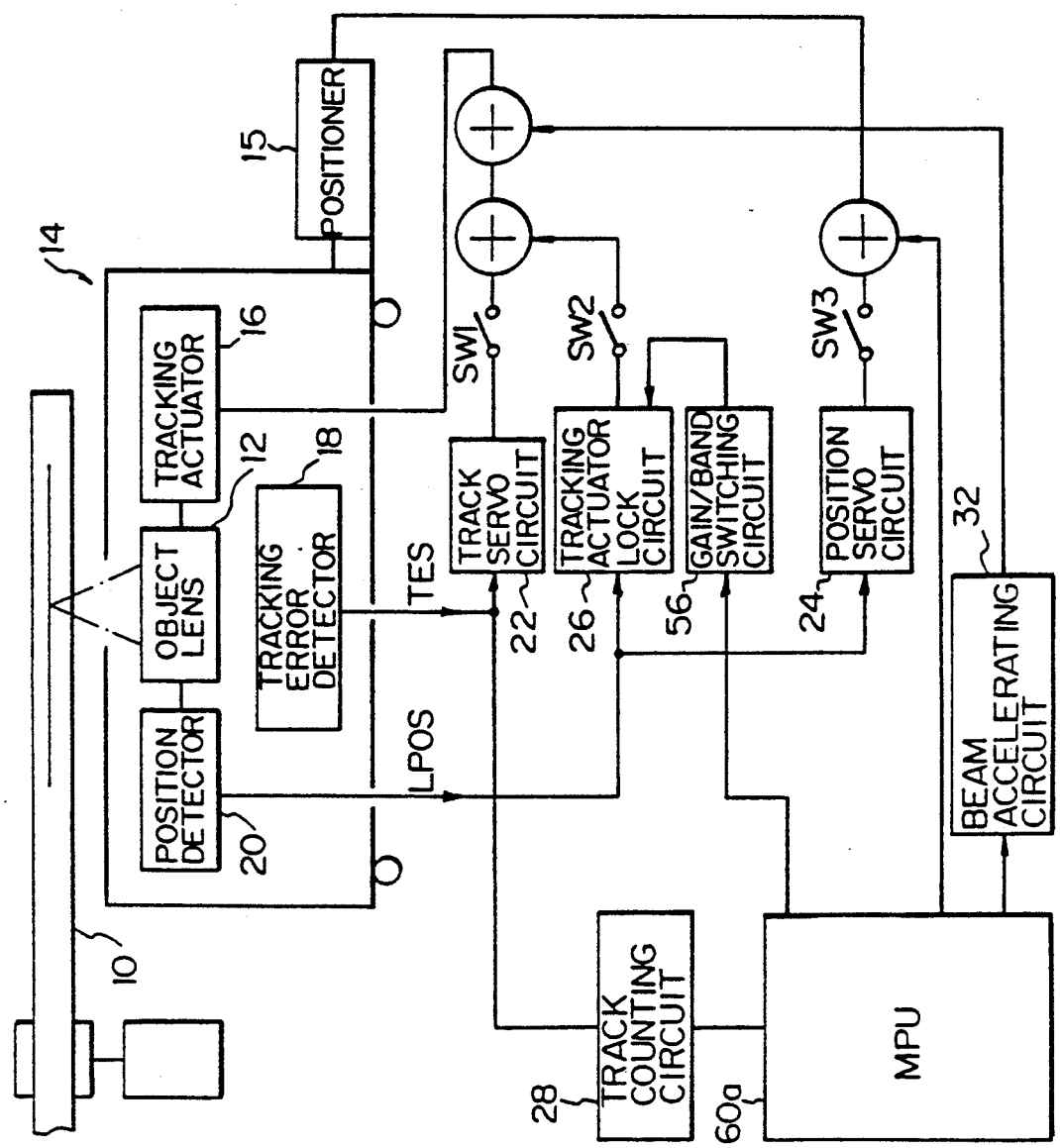
FIG. 12 is a principal block diagram of a seek control system according to a second embodiment of the present invention.

FIG. 12 is a principal diagram for explaining the second embodiment of the present invention.

In FIG. 12, the same reference numerals used in FIG. 5 represent the same parts. The only difference between FIG. 5 and FIG. 12 is that, in FIG. 12, a servo response switching circuit (or "gain/bond switching circuit" is provided between the MPU 60a and the tracking actuator lock circuit 26. The remaining parts are the same as those in FIG. 5, and therefore, a detailed description of these remaining parts is omitted here.

In such a positioner seek control system, according to the second embodiment of the present invention, there is provided a servo response switching circuit 56 for lowering the servo response performance of the tracking actuator lock circuit 26 for a constant time period after the acceleration of the tracking actuator 16 by turning on the servo switch circuit SW2.

Here, the servo response performance of the tracking actuator lock circuit 26 is a servo frequency band or the servo gain. Therefore, the servo response switching circuit 56 switches the servo frequency band, for a constant time period, to a low frequency band, or switches the servo gain to a low gain.

Figure 13:
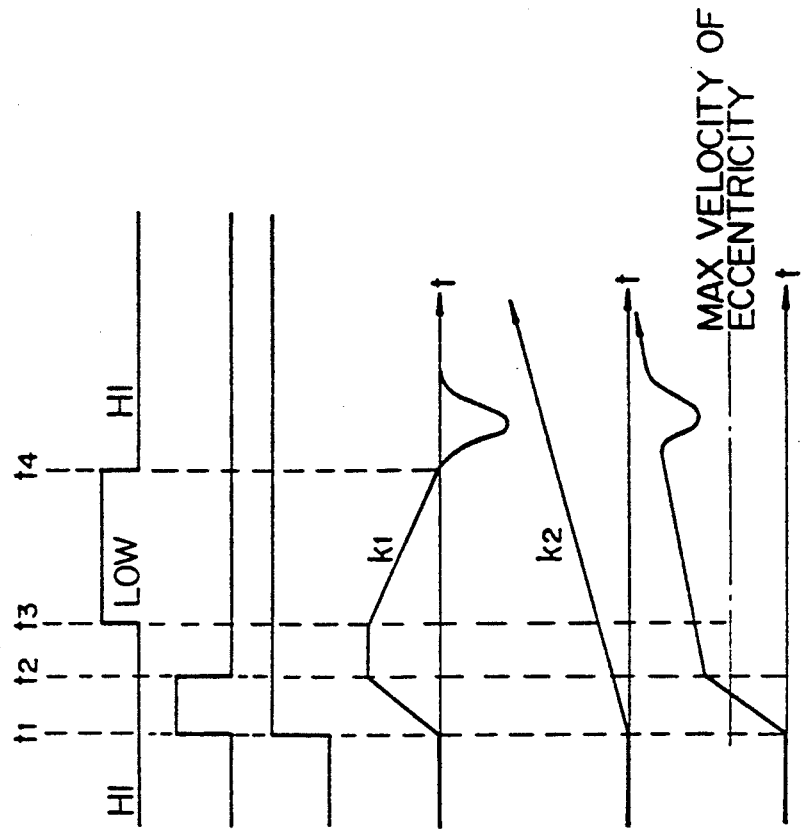
FIGS. 13A, 13B, 13C, 13D, 13E and 13F are operation timing charts of the seek control system shown in FIG. 12.

According to the second embodiment of the present invention, since the servo response performance of the tracking actuator lock circuit 26 is lowered for a constant time period between t3 and t4 as shown in FIG. 13A after the acceleration of the tracking actuator (or "actuator") 16 by turning on the servo switch circuit SW2 as shown in FIG. 13B, the acceleration $K_1$ of the actuator 16 during the period between t1 and t2 is much smaller than the acceleration of the actuator 16, without changing the servo response performance as in the first embodiment. Therefore, even when the acceleration of the tracking actuator 16 is increased after the time t2 by turning off the servo response switching circuit 56 as shown in FIG. 13D, the absolute value of the relative velocity of the tracking actuator 16 is not as large as that in the first embodiment. As a result, the sum of the relative velocity of the tracking actuator 16 and the velocity of the positioner 15 is not smaller than the maximum velocity of eccentricity as shown in FIG. 13F so that the miscounting of tracks can be prevented.

Figure 14:
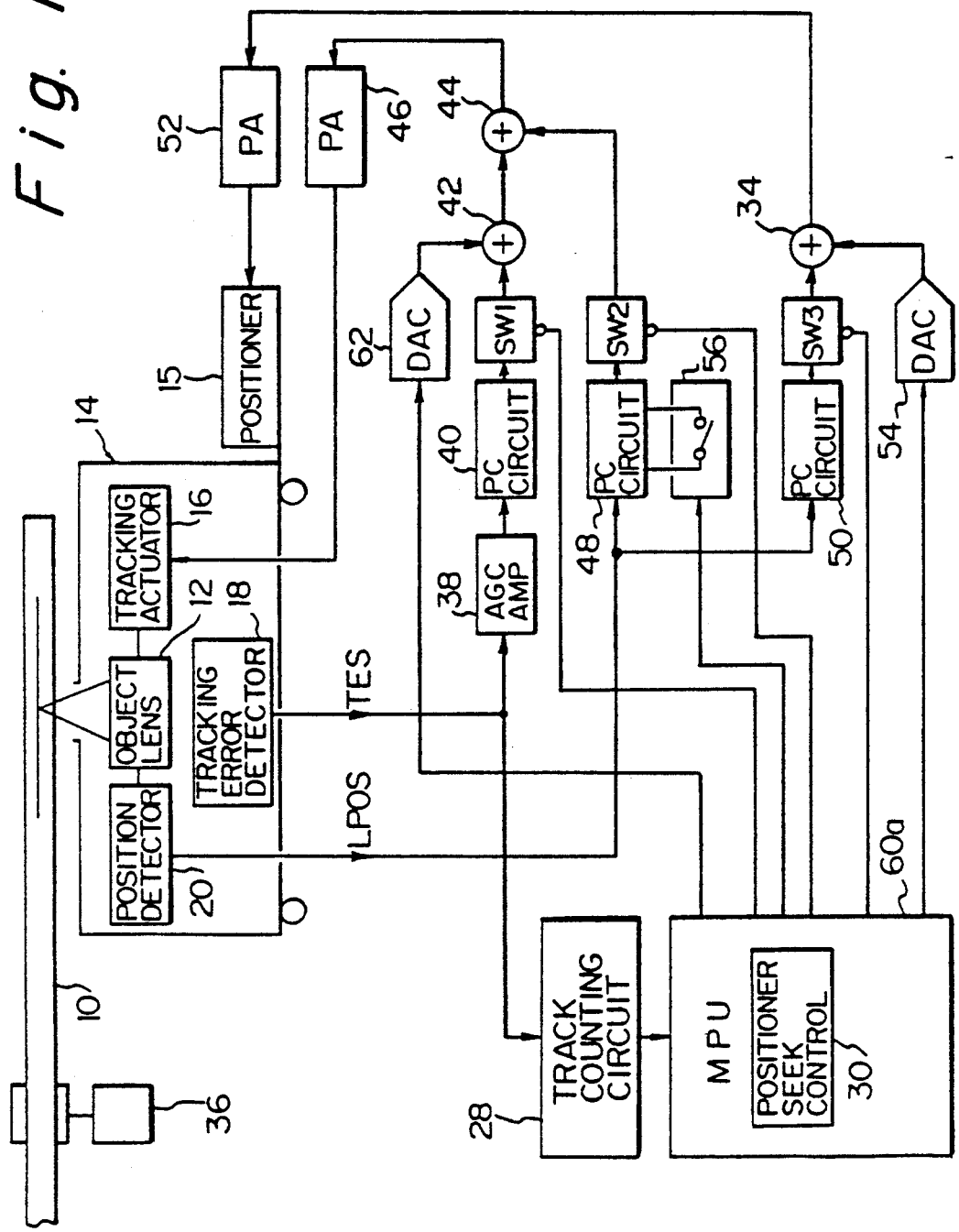
FIG. 14 is a detailed block diagram of the seek control system shown in FIG. 12.

FIG. 14 is a detailed block diagram of the seek control system shown in FIG. 12.

Figure 15:
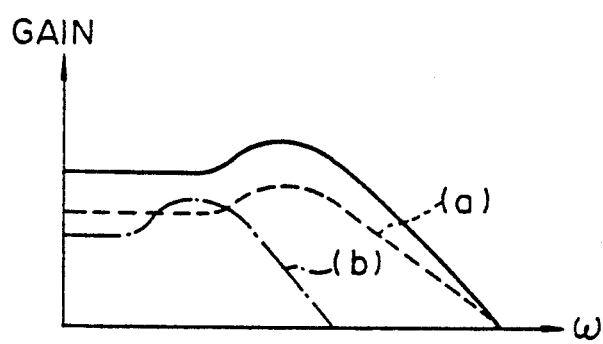
FIG. 15 is a graph showing frequency-gain characteristics when the gain or the frequency band is changed, according to the second embodiment of the present invention.

Referring to FIG. 7 and FIG. 14, the same reference numerals represent the same parts, and the only difference between FIG. 7 and FIG. 14 is that, in FIG. 14, there is provided a servo response switching circuit 56 between the microprocessor 60a, and a phase compensating circuit 48. Namely, to the phase compensation circuit 48 included in the tracking actuator lock servo loop, a servo response switching circuit 56 is added. The servo response switching circuit 56 carries out a switching control to lower the servo response performance for a constant time, after the end of the acceleration of the tracking actuator 16 by setting the actuator accelerating voltage to the DA converter 62 under the control of the MPU 60a. The switching to lower the servo response performance by the servo response switching circuit 56 is carried out by either one of the following switching controls as shown in FIG. 14:

(a) to lower the servo gain of the phase compensating circuit 48, and (b) to lower the servo frequency band of the phase compensating circuit 48. For example, as illustrated in FIG. 15, if the frequency characteristic of the tracking actuator lock by a normal phase compensating circuit 48 is a normal characteristic as illustrated by a solid line, the servo response switching circuit 56 switches the servo gain to be lowered as illustrated by a dash-line characteristic (a), or switches the servo frequency band to take on a characteristic (b) indicated by a dash-dot line.

Next, the positioner seek operation according to the second embodiment shown in FIG. 14 will be described with reference to an operation flow chart in FIGS. 16A and 16B and the timing chart shown in FIGS. 17A to 17K.

Figure 16B:
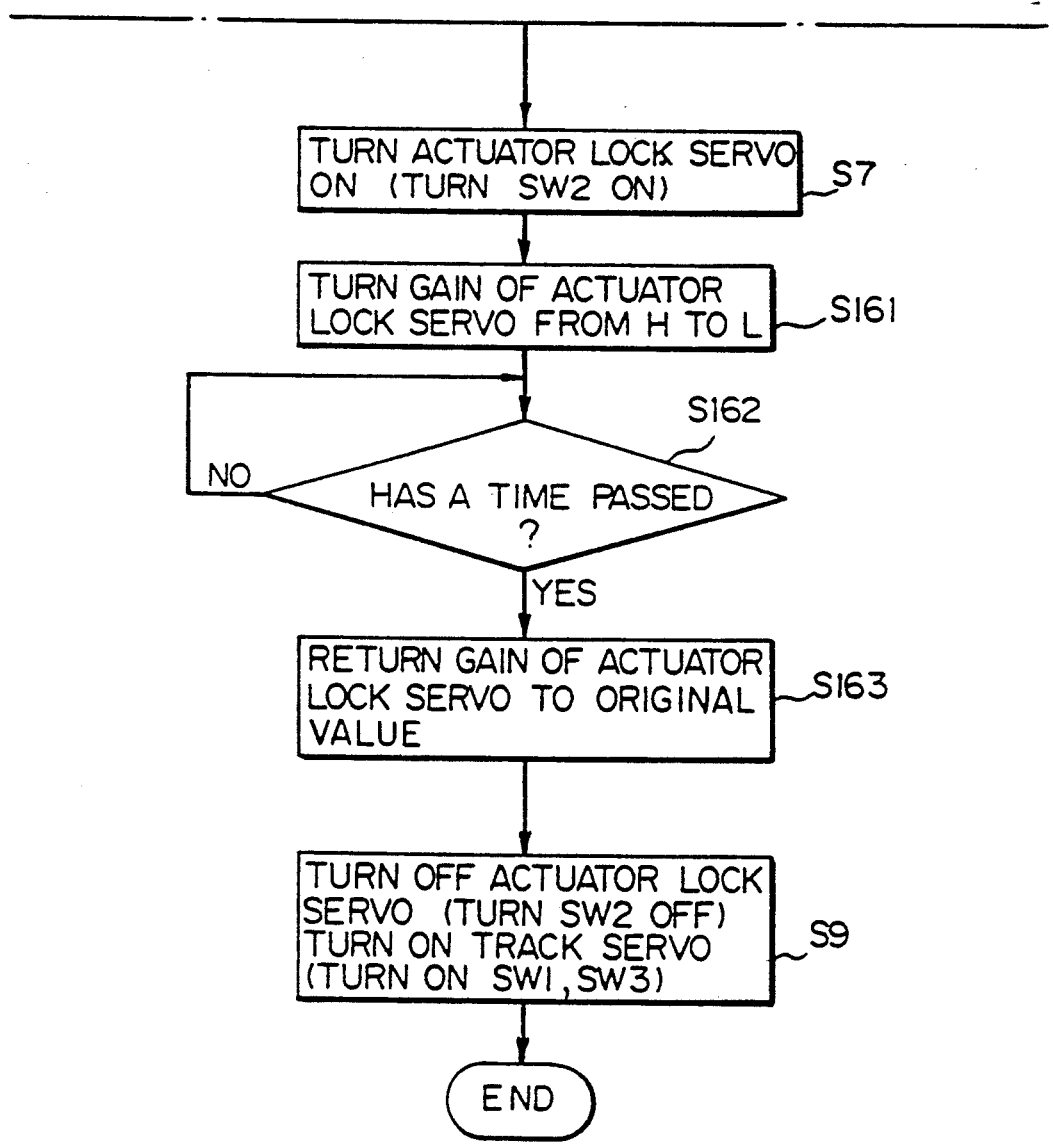

The flowchart shown in FIGS. 16A and 16B is different from the flow chart shown in FIG. 9 of the first embodiment in that, in FIGS. 16A and 16B, additional steps S161 to S163 are added. The remaining steps S1 to S9 are the same in FIGS. 9 and 16. Therefore, a detailed operation relating to the steps S1 to S9 is omitted here.

At the step S161, the servo gain, for example, of the phase compensating circuit 48 is switched from the high level to the low level by the servo response switching circuit 56 at the time t3 at which the tracking actuator lock circuit is enabled. In this manner, by suppressing the gain of the tracking actuator lock servo loop, the recovery force toward the neutral position (zero position) of the tracking actuator 16 is suppressed so that, as shown in the lens position signal LPOS and the LPOS velocity in FIG. 17H and 17I, the tracking actuator 16 is moved slowly to the neutral position (the zero position of the LPOS signal) with a response characteristic lower than the original response characteristic of the tracking actuator lock servo loop.

At step S7, almost simultaneous with the switching of the tracking actuator lock servo gain to the low level, the tracking actuator lock circuit, namely the servo switch SW2 is turned on. From this point, the tracking actuator lock servo is effective for the tracking actuator 16.

By the turning on of the tracking actuator lock servo, the tracking actuator 16 starts to move slowly to the neutral position as shown at a time t3 of FIG. 17I. The acceleration $K_1$ of the LPOS velocity when it returns to the neutral position is lower than the acceleration $K_2$ of the positioner 15 at that time.

The low gain of the tracking actuator lock servo is maintained during the period between the time t3 and the time t4.

When it reaches the time t4, the gain of the tracking actuator lock servo is returned to the original value. In practice, the servo response switching circuit 56 is returned to its original state so as to recover the phase compensation circuit 48 to have the normal servo gain.

As will be apparent from FIG. 17K, the beam velocity is given by the sum of the relative velocity of the tracking actuator 16 and the positioner velocity. Therefore, the beam velocity increases along with the increase of the positioner velocity. The beam velocity, however, is also lowered due to the lowering or the movement to the negative side of the tracking actuator 16 after the tracking actuator lock servo is turned on. The lowering of the beam velocity accompanied by the turning on of the tracking actuator lock servo of the beam velocity, however, is effected in a state in which the positioner velocity is sufficiently high after the time t3. Therefore the beam is not moved to the negative side (beam returning side), so that the miscounting of the tracks by the beam (e.g., a situation in which the tracks which have been already counted during the seek operation are counted again,) can be surely prevented. Also, as shown with the beam velocity in FIG. 17I, the maximum eccentricity velocity of the tracks in the eccentricity direction is known from the amount of eccentricity of the optical disk 10, the miscounting of the tracks due to the eccentricity of the optical disk 10 can be surely prevented by appropriately determining the lowered level of the gain during the period from the time t3 and t4. Namely, the lowered level of the gain is determined in such a way that the sum of the velocity of the tracking actuator 16 and the velocity of the positioner 15 is not below the maximum velocity of the disk 10 due to the eccentricity.

After the tracking actuator lock servo is enabled at S7, the gain of the tracking actuator lock circuit 26 is changed to the low level at step S161. Then, at step S162, the process waits for a constant time period until a time t3 at which time the positioner velocity has increased sufficiently. At the time t3 at which the constant time has passed, the process proceeds to S163 in which the gain of the tracking actuator lock servo is returned to the original level. Therefore, after the time t3 in FIG. 17A, the velocity of the tracking actuator 16 rapidly converges to the zero position (neutral position) and is locked in the neutral position. Note that, in the operation flow chart in FIGS. 16A and 16B, an example is shown in which the gain of the tracking actuator lock servo is switched to the lower gain after the end of the acceleration of the tracking actuator 16, however, as shown by the characteristic (c) in FIG. 17K, the same effect is obtained by determining the servo frequency band of the tracking actuator lock servo. Of course, the switching of the servo frequency band is accompanied by the gain switching.

The present invention is not restricted to the above-described first and the second embodiments, but various modifications are possible without departing from the spirit of the present invention. For example, in the above description of the first and second embodiments, the position servo circuit 24 is disabled when the tracking actuator lock circuit 26 is enabled at the start time of the positioner seek operation, however, the position servo circuit 24 may be kept in the enabled state even when the tracking actuator lock circuit 26 is enabled at the start time of the positioner seek operation, because the current flowing through the positioner servo loop is very small in comparison with the current from the MPU 60a through the DAC 54 for accelerating the positioner 15.

As has been described, according to the present invention, since the miscounting of tracks at the seek starting time can be surely prevented, positioning to a target track can be possible in a single seek operation, so that access time can be shortened.

I claim:

1. A positioner seek control system of a disk apparatus including a plurality of tracks, for recording or reproducing data onto or from a rotating medium by moving an object lens in proximity to a target track of said rotating medium, and for seeking a target track on said medium by controlling a positioner during a positioner seek control period, comprising:

a tracking actuator associated with said object lens, for moving said object lens in a direction to cross the plurality of tracks of said medium;

a head for mounting said tracking actuator and supplying a beam to the rotating medium through said object lens;

tracking actuator locking means, operatively connected to said tracking actuator, for controlling said tracking actuator to be positioned at a neutral position within a movable range of said tracking actuator;

tracking actuator servo means, operatively connected to said tracking actuator, for maintaining the beam on a given one of the plurality of tracks;

positioner servo means, operatively connected to said positioner, for maintaining said positioner at a position relative to the given track;

positioner accelerating means, operatively connected to said positioner, for accelerating said positioner during said positioner seek control period;

tracking actuator accelerating means, operatively connected to said tracking actuator, for accelerating said tracking actuator; and seek controlling means for deactivating said track actuator servo means and said positioner servo means and for activating said positioner accelerating means in a seek direction during the positioner seek control period, and for deactivating said tracking actuator locking means during a first predetermined period from the start time of the positioner seek control period, said first predetermined time period being determined so that a sum of a velocity of said positioner and a velocity of said tracking actuator generated by said tracking actuator locking means being activated, is always in the seeking direction of said positioner.

2. A positioner seek control system as claimed in claim 1, further comprising:

tracking actuator accelerating means, operatively connected to said tracking actuator, for accelerating said tracking actuator independently of said tracking actuator servo means during a second predetermined period from the start time of the positioner seek control period, said second predetermined period being shorter than said first predetermined period, and said first predetermined period, said second predetermined period, and said acceleration by said tracking actuator being determined so that a sum of a velocity of said positioner and a velocity of said tracking actuator generated by said tracking actuator locking means being turned on, is always in the seeking direction of the positioner.

3. A positioner seek control system as claimed in claim 1, wherein said tracking actuator is pivotally supported by an axis and has an end associated with said object lens, for moving said object lens in the direction to cross the plurality of tracks of said medium by rotating said tracking actuator in the direction to cross the plurality of tracks.

4. A positioner seek control system as claimed in claim 1, further comprising:

accelerating performance switching means, operatively connected to said tracking actuator locking means, for lowering acceleration performance of said tracking actuator by a predetermined amount during a third predetermined period after enabling said tracking actuator locking means, said predetermined amount of said acceleration performance of said tracking actuator and said third predetermined period being determined so that the sum of the velocity of said positioner and the velocity of said tracking actuator after enabling said tracking actuator locking means, is in the seeking direction of said positioner.

5. A positioner seek control system as claimed in claim 4, wherein said predetermined amount of said acceleration performance of said tracking actuator and said third predetermined period is determined so that the sum of the velocity of said positioner and the velocity of said tracking actuator after enabling said tracking actuator locking means, is larger than a maximum velocity of said medium due to an eccentricity of said medium.

6. A positioner seek control system as claimed in claim 4, wherein said acceleration performance of said tracking actuator is a gain of a servo loop including said tracking actuator locking means.

7. A positioner seek control system as claimed in claim 4, wherein said acceleration performance of said tracking actuator is a frequency band of a servo loop including said tracking actuator locking means.

8. A positioner seek control system as claimed in claim 1, further comprising:

tracking error detecting means for receiving a reflected beam from said medium to detect a tracking error signal;

position detecting means for detecting the position of said tracking actuator to output a lens position signal;

track servo means, operatively connected to said tracking error detecting means and to said tracking actuator, for controlling said beam to follow at least one of the plurality of tracks by the control of said tracking actuator based on said tracking error signal;

position servo means, operatively connected to said position detecting means and to said positioner, for controlling a position of said positioner to remove an effect of an eccentricity of said medium or an offset of the tracking actuator from said neutral position in said movable range of said tracking actuator;

track counting means for counting a number of tracks crossed by said beam, based on said tracking error signal; and positioner seek control means for controlling a velocity of said positioner in the direction toward the target track position, in a state in which said track servo means and said position servo means are both disabled and said tracking actuator locking means is enabled, and for terminating said velocity control of said positioner at a time substantially close to a time in which the detected track number from said track counting means coincides with the target track to move the positioner in proximity to the target track.

9. A positioner seek control system as claimed in claim 1, wherein a servo frequency band of said tracking actuator locking means is determined so that a first acceleration $K_1$ for returning said tracking actuator to said neutral position after enabling said tracking actuator locking means, is lower than a second acceleration $K_2$ of said positioner at that time.

10. A positioner seek control system as claimed in claim 1, wherein said disk apparatus is an optical disk apparatus.

* * * * *

UNITED STATES PATENT AND TRADEMARK OFFICE
CERTIFICATE OF CORRECTION

PATENT NO. : 5,258,966
DATED : November 2, 1993
INVENTOR(S) : Shigenori YANAGI

It is certified that error appears in the above-indentified patent and that said Letters Patent is hereby corrected as shown below:

Column 1, line 57, change "trocking" to --tracking--.

Column 2, line 42, change ";" to --,--;

line 46, after "period" insert --,--.

Column 3, line 9, change "to" to --2B, 2C, 2D and--.

Column 8, line 46, change "and" (2nd occur.) to --is--.

Column 11, line 60, before "is" insert --56--.

Column 13, line 54, delete "," (first occurrence).

Signed and Sealed this

Seventh Day of June, 1994

*Attest:*

BRUCE LEHMAN

*Attesting Officer*      Commissioner of Patents and Trademarks